US012760970B2

(12) United States Patent
Herrera De La Torre et al.

(10) Patent No.: US 12,760,970 B2
(45) Date of Patent: Oct. 13, 2026

(54) TREATMENT MODULE FOR A TREATMENT TUNNEL, TREATMENT TUNNEL, AND PRODUCTION SYSTEM FOR A TREATMENT MODULE

(71) Applicant: Dürr Systems AG, Bietigheim-Bissingen (DE)

(72) Inventors: Jose Joaquin Herrera De La Torre, Bonnigheim (DE); Volker Peindl, Keltern (DE); Peter Näpfel, Tamm-Hohenstange (DE); Wilfried Münstermann, Metelen (DE)

( * ) Notice: Subject to any disclaimer, the term of this patent is extended or adjusted under 35 U.S.C. 154(b) by 962 days.

(21) Appl. No.: 17/918,793

(22) PCT Filed: May 7, 2021

(86) PCT No.: PCT/DE2021/100419
§ 371 (c)(1),
(2) Date: Oct. 13, 2022

(87) PCT Pub. No.: WO2021/228324
PCT Pub. Date: Nov. 18, 2021

(65) Prior Publication Data
US 2023/0349637 A1 Nov. 2, 2023

(30) Foreign Application Priority Data
May 11, 2020 (DE) ..................... 10 2020 112 670.0

(51) Int. Cl.
*F26B 25/10* (2006.01)
*F26B 15/12* (2006.01)
*F26B 25/12* (2006.01)

(52) U.S. Cl.
CPC .............. *F26B 25/10* (2013.01); *F26B 15/12* (2013.01); *F26B 25/12* (2013.01); *F26B 2210/12* (2013.01)

(58) Field of Classification Search
CPC .......... F26B 25/10; F26B 15/12; F26B 25/12; F26B 2210/12; E04C 2/08; E04C 2/292; F27D 1/00; B05D 3/0254
See application file for complete search history.

(56) References Cited

U.S. PATENT DOCUMENTS 3,844,083 A * 10/1974 Farley, Jr. ................ E04C 2/40 52/745.11
4,546,553 A * 10/1985 Best ........................ F26B 21/00 427/372.2

(Continued)

FOREIGN PATENT DOCUMENTS

CN 103743233 4/2014
CN 109883192 6/2019

(Continued)

OTHER PUBLICATIONS

Nternational Searching Authority, "International Search Report," issued in connection with International Patent Application No. PCT/DE2021/100419, mailed on Nov. 26, 2021, 15 pages. English Translation Included.

(Continued)

*Primary Examiner* — David J Laux
(74) *Attorney, Agent, or Firm* — Hanley, Flight & Zimmerman, LLC

(57) ABSTRACT

The invention relates to a treatment tunnel, to a production system, and to a treatment module (100) for a treatment tunnel (200) which has treatment modules (100) following one another in the longitudinal direction (L), the treatment module comprising an inner housing (102), which has at least one surface element (104, 105, 106, 107, 108) composed of prefabricated cassettes (10, 11, 12, 13, 14, 15, 17). The surface element (104, 105, 106, 107, 108) is divided, in the longitudinal direction, into a pitch corresponding to at least one cassette width (90, 92). The cassettes (10, 11, 12, (Continued)

13, 14, 15, 17) are arranged within the surface element (104, 105, 106, 107, 108) with their longitudinal sides (68) perpendicular to and with their transverse sides (66) parallel to the longitudinal extent (140), at least in some regions, and/or the cassettes (10, 11, 12, 13, 14, 15, 17) are arranged within the surface element (104, 105, 106, 107, 108) with their transverse sides (66) perpendicular to and with their longitudinal sides (68) parallel to the longitudinal extent (140) of the surface element (104, 105, 106, 107, 108), at least in some regions.

24 Claims, 28 Drawing Sheets

(56) References Cited

U.S. PATENT DOCUMENTS

| | | | | |
|---|---|---|---|---|
| 4,731,016 | A * | 3/1988 | Dixon | F26B 25/009 110/193 |
| 4,764,108 | A * | 8/1988 | Carthew | F27D 1/00 432/247 |
| 6,074,206 | A * | 6/2000 | Lauersdorf | F27D 1/0023 432/252 |
| 6,905,332 | B1 * | 6/2005 | Neal | A21B 1/24 432/247 |
| 6,990,749 | B2 * | 1/2006 | Roesler | F26B 25/08 34/233 |
| 11,614,282 | B2 * | 3/2023 | Robinson | F27B 17/0083 110/188 |
| 2004/0209217 | A1 * | 10/2004 | Roesler | F26B 25/08 432/121 |
| 2007/0094967 | A1 * | 5/2007 | Kosny | E04C 2/292 52/309.9 |
| 2007/0261264 | A1 * | 11/2007 | Ortlieb | B60S 3/002 198/782 |
| 2019/0376288 | A1 * | 12/2019 | Worton | E04H 1/005 |
| 2019/0389434 | A1 * | 12/2019 | Moll | F26B 21/10 |
| 2021/0340799 | A1 * | 11/2021 | McGee | E05D 15/242 |

FOREIGN PATENT DOCUMENTS

| | | |
|---|---|---|
| DE | 1124219 | 2/1962 |
| DE | 102009045808 | 4/2011 |
| EP | 0095717 | 12/1983 |
| EP | 0534267 | 3/1993 |
| EP | 0867674 | 9/1998 |
| EP | 0957324 | 11/1999 |
| EP | 1321731 | 6/2003 |
| EP | 1892346 | 2/2008 |
| EP | 2781866 | 9/2014 |
| FR | 1105713 | 12/1955 |
| FR | 2578038 | 8/1986 |
| JP | S52-87700 | 6/1977 |
| JP | 85325956 | 3/1978 |
| JP | S57-87295 | 5/1982 |
| JP | H04104930 | 4/1992 |
| JP | H06-022892 | 3/1994 |
| WO | 2021228324 | 11/2021 |

OTHER PUBLICATIONS

Nternational Searching Authority, "Written Opinion of the International Searching Authority," issued in connection with International Patent Application No. PCT/DE2021/100419, mailed on Nov. 30, 2021, 22 pages. Rough Machine Translation Included.

Nternational Searching Authority, "First Notice Informing the Applicant of the Communication of the International Application," issued in connection with International Patent Application No. PCT/DE2021/100419, mailed on Dec. 16, 2021, 1 page.

* cited by examiner

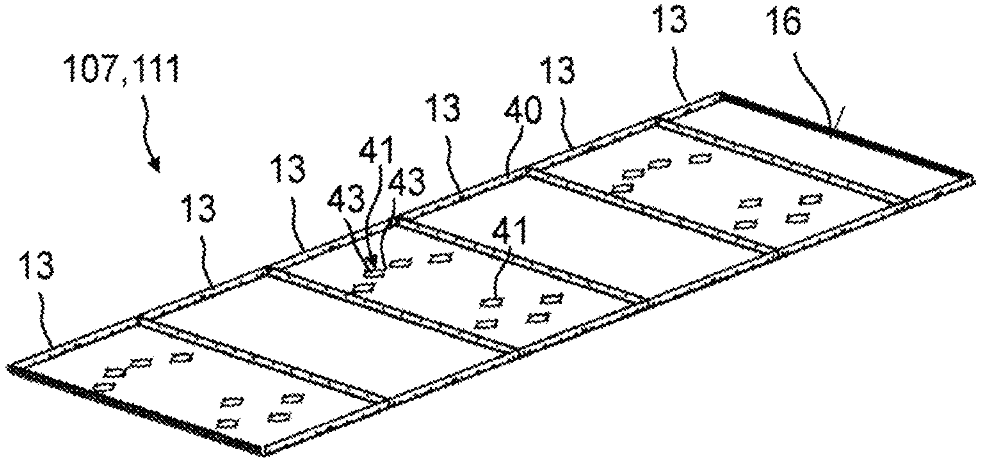
Fig.
22
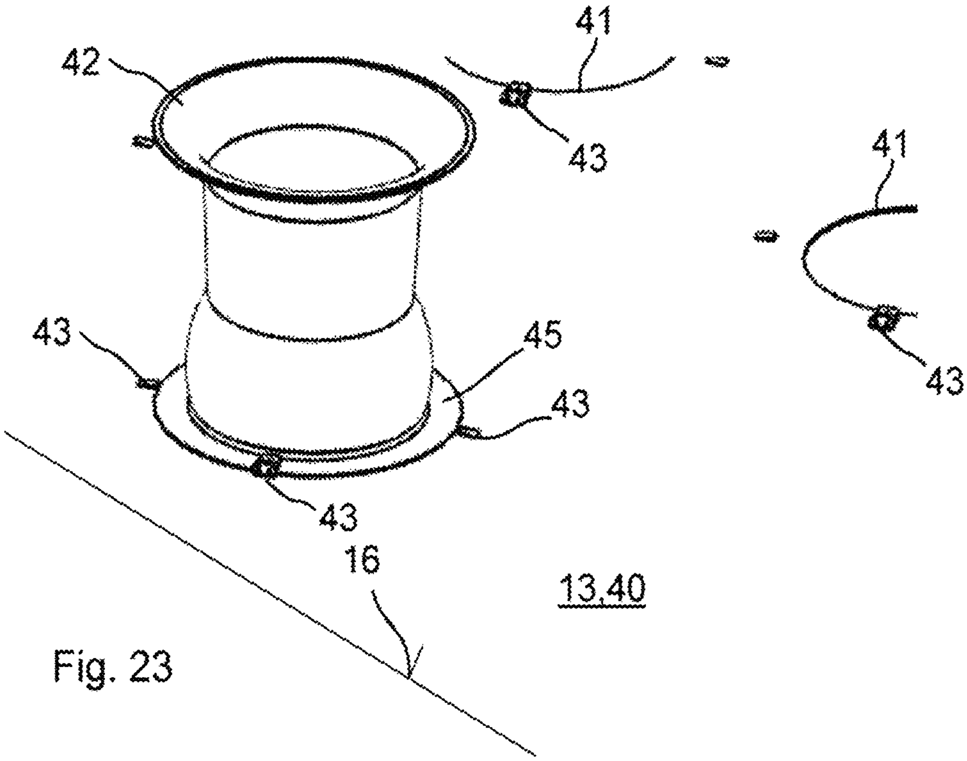
Fig. 23

TREATMENT MODULE FOR A TREATMENT TUNNEL, TREATMENT TUNNEL, AND PRODUCTION SYSTEM FOR A TREATMENT MODULE

RELATED APPLICATION

This application is a national phase of International Application No. PCT/DE2021/100419, filed on May 7, 2021, which claims the benefit of German Application No. 10 2020 112 670.0, filed on May 11, 2020. The foregoing International Application and German Application are incorporated herein by reference in their entirety and for all purposes.

TECHNICAL FIELD

The invention relates to a treatment module for a treatment tunnel which has one or more treatment modules following one another, as well as a treatment tunnel which has one or more treatment modules following one another and a production system for a treatment module.

PRIOR ART

Dryers in paint shops for vehicles (passenger motor vehicles, vans, trucks, buses) generally operate at curing temperatures of between 100° and 220° C. These dryers are thus produced with a decoupled outer wall having as few heat bridges as possible. The dryer interior is a sealingly welded tunnel in which the vehicle bodies are located and which at higher temperatures can expand in the longitudinal direction into a region with compensators. In this case, the dryer is generally configured as a tunnel through which the vehicle bodies are moved and which can have a length of, for example, up to 100 m. The outer cladding is screwed onto displaceable profiles. As a result, the thermal expansion of the interior can take place freely and without influencing the cold outer shell.

For reasons of economy and flexibility, so-called panel dryers are increasingly used today. These dryers are constructed with continuous panels which have a continuous connection of the inner wall to the outer wall and thus are not designed for such differences in temperature and expansion.

The panels are generally welded together in order to ensure the required tightness. To this end, large flat sheet metal elements are used, with the purpose of reducing as far as possible the complex sealing welding in the interior of the dryer.

DISCLOSURE OF THE INVENTION

An object of the invention is to provide a treatment module for dryers in paint shops which can be manufactured economically and can be used flexibly.

A further object of the invention is to provide a treatment tunnel which has one or more treatment modules which can be manufactured economically and can be used flexibly.

A further object of the invention is to specify a production system for such treatment modules.

The objects are achieved by the features of the independent claims. Advantageous embodiments and advantages of the invention emerge from the further claims, the description and the drawing.

The features set forth individually in the claims are able to be combined together in a technically expedient manner and can be supplemented by the explanatory facts from the description and by details from the figures, wherein further variants of the invention are shown.

According to one aspect of the invention, a treatment module for a treatment tunnel which has one or more treatment modules following one another in a longitudinal direction is proposed, comprising at least one inner housing which has at least one surface element in the form of a bottom wall and/or a side wall and/or a top wall and/or an inner wall, wherein the at least one surface element has a longitudinal extent in the longitudinal direction and a transverse extent transversely to the longitudinal direction.

The at least one surface element is formed from prefabricated cassettes, in particular sheet metal cassettes, which have transverse sides with a cassette width in the longitudinal direction and longitudinal sides with a cassette length transversely to the longitudinal direction. The surface element is divided at least in the longitudinal direction into a grid spacing which corresponds to at least a cassette width of the cassettes in the longitudinal direction. In this case, the cassettes are arranged within the surface element with their longitudinal sides transversely to the longitudinal extent and with their transverse sides parallel to the longitudinal extent of the surface element at least in some regions, and/or the cassettes are arranged within the surface element with their transverse sides transversely to the longitudinal extent and with their longitudinal sides parallel to the longitudinal extent of the surface element at least in some regions.

In particular, walls in the form of a bottom wall or a top wall can consist exclusively of longitudinally divided cassettes or a mixture of longitudinally divided and transversely divided cassettes. Longitudinally divided cassettes are arranged with their longitudinal sides transversely, in particular perpendicular, to the longitudinal extent and with their narrower transverse sides parallel to the longitudinal extent. Transversely divided cassettes are arranged with their transverse sides transversely, in particular, to the longitudinal extent and with their longitudinal sides parallel to the longitudinal extent. The transversely divided cassettes can thus also be arranged independently of a grid spacing.

Advantageously, the grid spacing can be selected such that a transverse extent of a surface element corresponds to a cassette length or a multiple or a fraction thereof, and that a longitudinal extent of a surface element corresponds to a multiple of a cassette width or a fraction thereof. Thus a surface element can be expediently formed from individual cassettes which are arranged, for example, adjacent to one another and/or on top of one another. The cassettes can be advantageously arranged longitudinally or transversely to the longitudinal extent of the treatment module. The cassettes in a surface element are advantageously arranged relative to an adjacent surface element such that the edges of the cassettes are aligned when the surface elements are connected together. The cassettes in a surface element can advantageously have the same cassette width.

Moreover, cassettes having a different cassette width, for example a half cassette width, can be arranged therein. Advantageously, a bottom wall and/or a top wall, which have in each case, for example, at the same position in the respective surface element one or more cassettes with such other cassette widths, can adjoin a surface element which is configured, for example, as a side wall and which has one or more cassettes with such other cassette widths. If on the other hand, for example due to a door in a surface element, the grid spacing is to be broken up and smaller cassette widths are to be used, then this width can be different from the cassette width on the top wall or the bottom wall.

The bottom wall or top wall can be formed from cassettes such that a plurality of cassettes are joined together on their longitudinal sides to form a composite structure. Such cassettes can be joined together on the narrow sides of the cassettes and form the corresponding bottom wall or top wall.

Alternatively, a plurality of cassettes can be joined together on their longitudinal sides to form a composite structure. On the narrow sides of the cassettes, one, two or more cassettes can bear on one side of the composite structure with their longitudinal sides transversely to the cassettes of the composite structure and abut one another with their narrow sides. Thus only one composite structure has to be produced, two cassettes being assembled thereon transversely to the cassettes of the composite structure. This reduces the production time of the bottom wall and top wall. The top wall and bottom wall can be assembled in a treatment module such that the two cassettes are arranged on the composite structure of cassettes on opposing sides of the treatment module.

Advantageously, a modular construction of a treatment module results, in particular, for a dryer of a paint shop which is based on such prefabricated cassettes. The cassettes, which are preferably made of sheet metal, are preassembled to form side walls, inner walls, bottom walls and top walls, and sealingly welded. Thus the dryer modules are assembled from the surface elements produced in this manner, in the form of bottom walls, side walls, inner walls and top walls.

The treatment module can also be configured as a cooling module, in particular as a cooling module which adjoins a dryer of a paint shop. Furthermore, the treatment module can be configured as a continuous dryer, in particular with a discontinuous conveyor for conveying the component to be dried.

Each cassette has a similar basic structure for the respective bottom wall, side wall, inner wall or top wall.

The cassettes are freely parameterizable in their dimensions, such as height and width, and can be designed to be torsionally stiff and accurately fitting. A cassette width of the cassettes can be, for example, up to 1000 mm, a cassette length can be up to 3800 mm, and a thickness can be up to 80 mm. The material thickness of the sheet metal used for the cassettes can be, for example, 1.5 mm. Alternatively, other sheet metal thicknesses, such as for example 1.0 mm, 2.0 mm, 2.5 mm or 3.0 mm, are also possible.

The cassettes can expediently be configured as bottom wall cassettes, side wall cassettes, top wall cassettes, or inner wall cassettes depending on the use in a bottom wall, a side wall, inner wall or a top wall. Optionally, outer cladding elements of the treatment module can also be formed by cassettes. Alternatively, conventional profiled sheets, for example trapezoidal sheets, corrugated sheets or the like can be used as the outer cladding elements. Optionally, in some regions cassettes can be present as outer cladding elements and in some regions profiled sheets can be present as outer cladding elements. Profiled sheets can advantageously be used as an inexpensive outer cladding element, in particular for a top wall and/or a side wall.

The modularization of the individual parts of the treatment module permits an automation for a just-in-time manufacture of the cassettes according to the sequence. Thus a continuous flow production is also possible for the assembly of the elements and the final dryer.

The cassettes are also inherently stable and torsionally stiff without an additional joining process. Embossed stiffeners such as channels or surfaces can lead to additional stiffness. As a result, stiffening ribs can be reduced or completely dispensed with, since the stiffening is already directly integrated in the cassette. Noises generated by personnel walking in the treatment module can thus be reduced. The embossed portions are also advantageous for positioning the surface elements to be assembled.

A reduction in the materials used and an improvement in the logistics is possible by the construction of the treatment module according to the invention. The transport of the cassettes can take place on roller tables, ball tables or brush tables directly to the assembly stations. A handling apparatus such as a crane, manipulator or the like is not required. As a result, the risk of injury can be reduced when handling large unstable parts.

An orientation of the cassettes during production can advantageously be carried out on a fixed stop and between the cassettes, for example, by means of positioning elements such as bores, raised portions, depressions or recesses in lateral angled-back tabs.

Adjacent cassettes in surface elements can be connected, for example, by means of at least one of the following joining methods: riveting, screwing, clinching, welding, in particular resistance welding, or the like.

It is possible to achieve less welding distortion, for example, by welding in the region of the cassette flanges where more material is available and by additional embossed portions, whereby a heat flow through the wall of the inner housing to the outside can be reduced or even interrupted.

A fully welded construction of the treatment module also has the advantage of being airtight, whereby during the operation of the treatment module an accumulation of solvents in the insulation material between the inner housing and outer housing can be avoided.

As a result, a more efficient assembly of the treatment module for an air-tight connection of the prefabricated cassettes can be implemented. An automation of the sealing welding of the bottom walls, side walls and top walls and the inner walls consisting of the individual cassettes is advantageously possible. The sealing welding during the connection of adjacent cassettes and/or surface elements can expediently take place on the smooth side of the cassette, for example by gas-shielding welding or soldering or the like.

Riveted connections can also be advantageously used when joining adjacent cassettes. The use of highly tear-resistant standard rivets in the positioning holes of the cassettes is expedient for simple and positionally accurate assembly. As a result, welding processes can be dispensed with, whereby the joining process is able to be managed in a simpler manner.

It is also possible to provide an air-tight connection between the individual cassettes so that no solvent-containing air can pass into the insulating material between the inner housing and outer housing and accumulate therein to form a possibly dangerous fire load. Riveted connections are vibration-resistant and can be specifically designed for use at temperatures of up to at least 220° C.

Alternatively or additionally, according to an advantageous embodiment of the treatment module each cassette can have one or more standard interfaces for a connection to an adjacent cassette at least in the same and/or adjacent surface element.

In this case each cassette can have one or more standard interfaces for a connection to an adjacent cassette in the same surface element or to an adjacent cassette in an adjoining surface element, which protrudes, in particular transversely protrudes, from the surface element which comprises the cassette.

The standard interfaces correspond to one another and are configured in each case to be the same on the respective same side of the cassettes of the same surface element. The standard interfaces are configured in each case to be complementary on the sides of the cassettes which are different but which are to be connected together when joining cassettes together, so that for example they interlock and in each case can be connected in a simple manner. Optionally, connecting elements such as rivets can also be used in order to connect the cassettes, or the cassettes can alternatively or additionally be welded along a joining seam.

Advantageously, when connecting the cassettes the interfaces can be easily accessible, in particular from one side of the joined-together cassettes, without side parts of large surface area being having to be turned or rotated.

Standard interfaces of cassettes which are arranged in different surface elements are configured in each case such that standard interfaces of different cassettes to be joined together are configured in each case in a complementary manner.

In this manner, the cassettes in the same surface element, and in surface elements which are different but which are to be joined together, are suitable for being connected according to the poka-yoke principle so as to avoid confusion, such as in a puzzle game.

According to an advantageous embodiment of the treatment module, a standard interface can have at least one frame element with at least one positioning element for a connection of one cassette to an adjacent cassette in the same or in an adjacent surface element. In particular, in this case the at least one frame element can be configured as a protruding tab, in particular as an angled-back tab, which is angled back from a main surface of the cassette. Advantageously, the frame element can also be configured as a folded-over edge. The frame element in this case can advantageously be folded over twice. Positioning elements can be configured, for example, as bores, raised portions, depressions or recesses. Positioning elements of adjacent cassettes to be joined together can advantageously be configured in a complementary manner to one another so that when connecting adjacent cassettes they can interlock and thus permit a reliable and reproducible positioning of the cassettes.

More rapid and simpler positioning and orientation of the cassettes to one another can also be implemented by means of stops. As a result, no additional measuring is necessary. Thus, for example, assembly errors can be reduced by the use of positioning holes or positioning channels in the cassettes. Since in the construction of the treatment module according to the invention welding takes place in the region of the protruding tabs, in particular angled-back tabs, in particular folded-over edges of the cassettes, the heat dissipation is improved by the additional material and it leads to less heat distortion in the components.

According to an advantageous embodiment of the treatment module, a standard interface can have at least one frame element with at least one positioning element and/or at least one embossed portion, in particular at least one embossed portion in a main surface of the cassette for a connection of one cassette to an adjacent cassette in different adjoining surface elements. The embossed portion can be configured, for example, as a raised portion or depression in the main surface.

In particular, in this case the at least one embossed portion can be provided for positioning at least one inner wall of the inner housing. A bottom wall can have, for example as a standard interface for an inner wall, an embossed portion in a main surface of the cassette for positioning the inner wall. Optionally, the inner wall or the surface element to be connected can have an embossed portion which is complementary thereto. Thus a simpler assembly of the inner elements of the treatment module can be implemented.

Inner walls can also be formed from prefabricated cassettes. Advantageously, these inner walls can then correspond to the corresponding grid spacing of the bottom walls, the side walls and the top walls. The inner walls in this manner can also be produced particularly economically.

According to an advantageous embodiment of the treatment module, a standard interface between a side wall and a bottom wall can have a support strip which is configured, in particular, for supporting the side wall.

Thus a simple and reproducible positioning of the side wall is possible when constructing the treatment module.

According to an advantageous embodiment of the treatment module, a standard interface between a side wall and a bottom wall can have a pressure strip. The side wall can thus be advantageously welded to an edge of the bottom wall.

Since in the construction of the treatment module according to the invention welding takes place in the region of the protruding, in particular angled-back, tabs or folded-back edges of the cassettes, the heat dissipation is improved by the additional material and it leads to less heat distortion in the components.

According to an advantageous embodiment of the treatment module, the standard interfaces for connecting cassettes and/or surface elements can be configured according to the poka-yoke principle so as to avoid confusion. Positioning according to the poka-yoke principle, which is simpler and avoids confusion by different profiling of the cassettes and/or surface elements, can promote the assembly of bottom walls, side walls and top walls and optionally inner walls to form complete modules. Thus advantageously an incorrect assembly of a treatment module can be avoided.

More rapid and simpler positioning and orientation of the cassettes to one another can be implemented by means of stops. As a result, no additional measurement is required. Thus, for example, assembly errors can be reduced by the use of positioning holes or positioning channels in the cassettes.

According to an advantageous embodiment of the treatment module, the prefabricated cassettes can have embossed stiffening structures in their main surface. Raised or recessed embossed stiffening elements, such as channels or surfaces, can lead to additional stiffness. As a result, stiffening ribs can be reduced or completely dispensed with.

According to an advantageous embodiment of the treatment module, closed and/or locked corner connections can be provided for connecting and/or stiffening angled-back frame elements of the cassettes. Thus the cassettes and the surface elements constructed therefrom are also configured to be inherently stable and torsionally stiff without additional joining processes. Advantageously, a higher stability results from the cassette construction, due to the doubling of the material, with in each case closed corners. The corner connections can advantageously provide a mechanical locking of the cassettes.

According to an advantageous embodiment of the treatment module, the surface elements can be positioned relative to one another by means of interlocking profiles of the cassettes. Suitable embossed portions in the cassettes can facilitate the positioning of abutting components so as to avoid confusion.

According to an advantageous embodiment of the treatment module, the inner housing can be surrounded by a thermally decoupled outer housing. In particular, the inner housing can be movable independently in the longitudinal direction in the case of a thermally induced longitudinal change. As a result, a thermal expansion of the inner housing and possible longitudinal displacements of the inner housing do not have an effect on the outer housing. The mechanical stability of the treatment module can thus be effectively increased.

According to an advantageous embodiment of the treatment module, thermally decoupled holders, in particular suspension rails for outer cladding elements, can be arranged on the inner housing. Suspension rails for the outer cladding, which are perforated and thermally decoupled by insulating material for the thermal insulation, such as for example glass fiber material, advantageously permit the thermal decoupling of the outer housing of the treatment module. The suspension rails can be slidably mounted so that the inner wall of the treatment module can expand without the displacement of the suspension rails and thus the outer wall. These measures advantageously lead to less heat transfer and fewer heat losses. Optionally, a further layer of insulation can also be arranged between the suspension rails.

The insulating material can be introduced directly into the cassettes of the outer cladding elements. These outer cladding elements are then directly screwed onto the cassettes of the inner housing with thermal decoupling. In this embodiment, thermal distortion can be compensated by slots in the cassettes of the outer cladding elements.

According to an advantageous embodiment of the treatment module, the outer housing can have one or more outer cladding elements in the form of profiled sheets at least in some regions. This permits a cost-effective outer housing. The profiled sheet or the profiled sheets can be adapted easily to the desired external dimensions.

According to an advantageous embodiment of the treatment module, holders can be used as thermal insulation of outer cladding elements in the form of profiled sheets which are thermally decoupled, for example by means of glass fibers or the like, from the inner housing. The profiled sheet or the profiled sheets can be arranged on C-shaped carriers which are fastened to the holder.

According to an advantageous embodiment of the treatment module, an inner wall can be provided for receiving one or more filter frames. In particular, in this case filter inserts can be fixed or fixable by means of clamps in the filter frame. In this manner, it is advantageously possible to use a universal filter frame. As a result, a counter frame on the filter insert can advantageously be dispensed with. Such an integrated fastening mechanism without a counter frame for filter inserts can advantageously make it possible to use different filter sizes.

The universal filter frame with embossed portions can receive, for example, small filter inserts which are clamped from an inner face of the filter wall by clamps, whilst large filter inserts can be clamped from an outer face by clamps.

Alternatively or additionally, filter boxes can also be used instead of a filter wall with filter inserts. Advantageously, a filter box can extend over the complete cassette width and cassette height. This permits an improved accessibility to the cassettes inside the treatment module.

According to an advantageous embodiment of the treatment module, an inner wall can be provided for receiving one or more nozzles. In particular, in this case an interface between an inner wall and a nozzle can have a tongue/groove holder. In this manner, it is advantageously possible to carry out a required change of nozzles more rapidly and without the use of tools. Thus it is possible to install nozzles without the use of tools due to cassettes having integrated holders and locking. The nozzles can simply be inserted into a tongue/groove holder and are automatically locked.

According to an advantageous embodiment of the treatment module, at least one thermally decoupled door segment can be provided in a lateral surface element, wherein at least one door hinge of the door segment has an adjustable spring force.

The additional thermal decoupling of the door segment can be advantageously implemented by a divided door frame with an additional sealing lip, for example made of glass fiber material, a two-part thermally decoupled door leaf, a double seal on the door leaf and a door hinge with an adjustable spring mechanism. The intermediate space between the door frame and door leaf can be advantageously divided by the sealing lip made of glass fiber material. In this manner, it is possible to reduce the heat losses and heat bridges on the door segment and the suspension of the outer cladding.

An improved tightness of the door results from an additional spring on the door fittings. Thus the contact pressure can be adjusted in a targeted manner so that the door closes tightly over the entire periphery. Less wear occurs on the door seal since two seals are mounted on the door leaf.

According to an advantageous embodiment of the treatment module, an integrated docking geometry, in particular a welding frame integrated in a lateral surface element, can be provided for the assembly of treatment module to treatment module.

For the assembly, a loose foot can be used as a bearing foot of the treatment module. In this case, firstly a guide element is mounted on the floor of the installation site, above which the bearing foot is arranged.

The bearing foot encompasses this guide element on two sides. Thus in the event of a temperature-induced longitudinal expansion of the treatment module, the bearing foot can be easily displaced along this guide element.

The docking geometry which is integrated in the treatment module facilitates the assembly of treatment module to treatment module, in particular in the case of a construction in situ in a production facility. Advantageously, the treatment module has more stable edges at the connecting joints. Moreover, additional covers in the region of the connecting points can be dispensed with when connecting treatment module to treatment module. As a result, for example, an additional welding frame for connecting two adjoining treatment modules can be dispensed with.

According to a further aspect of the invention, a treatment tunnel which has one or more treatment modules following one another is proposed, wherein an integrated docking geometry, in particular a welding frame integrated in a surface element, is provided for the assembly of treatment module to treatment module.

By the integrated welding frame, for example, an additional welding frame for the assembly of different treatment modules in a successive arrangement can be dispensed with. In this manner, it is possible to produce a treatment tunnel from successive treatment modules in a more advantageous manner. Thus different production steps, for example in a paint shop for motor vehicle bodies, can be linked in a suitable manner. The modular construction facilitates a positioning of the treatment tunnel in a production system in situ at the customer's premises.

According to an advantageous embodiment of the treatment tunnel, a thermal compensator can be provided for a flexible connection of treatment module to treatment module. The compensator is preassembled in the treatment module, for compensating for thermally induced changes in mechanical dimensions and can be screwed on, for example, from the inner face of the treatment module. This is possible due to the easy accessibility in the treatment module.

As a result, treatment modules can be joined together in a simpler manner. Even possibly required maintenance of the compensator can thus be carried out more easily. Moreover, with such an arrangement of the compensator a cross-sectional reduction in the channels of the treatment module can be avoided, whereby less pressure loss occurs from blown-in air in the treatment module.

According to an advantageous embodiment of the treatment tunnel, a telescopic connection can be provided for connecting at least two outer cladding elements. By means of the telescopic connection a simpler assembly of outer cladding elements can be achieved. As a result, a prefabrication of outer cladding parts and an improved replaceability of damaged cladding parts is possible. Thus cost-intensive work of the installation in situ at the customer's premises can be transferred to the production of the treatment module or treatment tunnel.

According to a further aspect of the invention, a production system for a treatment module is proposed, comprising at least a first line for producing prefabricated cassettes, in particular sheet metal cassettes, in particular bottom wall cassettes, side wall cassettes, top wall cassettes and inner wall cassettes, a second line for connecting the prefabricated cassettes to surface elements, in particular to form the bottom walls, side walls, top walls, and inner walls, and a third line for connecting the surface elements to form a treatment module.

Advantageously in the production line according to the invention, cassettes, in particular sheet metal cassettes, can be manufactured fully automatically on the first line. This is particularly advantageous, since the cassettes have a similar basic structure respectively for the bottom wall, side wall, top wall and optionally the inner wall and corresponding standard interfaces.

Expediently a continuous flow production for producing whole bottom walls, side walls, top walls and inner walls can take place on the second line, whilst a continuous flow production for manufacturing treatment modules ready for shipment can take place on the third line.

According to an advantageous embodiment of the production system, in the first line, in particular, production steps can be implemented by means of separating and bending, and/or in the second line, in particular, production steps can be implemented by means of joining, applying cladding and/or insulation and/or in the third line, in particular, production steps can be implemented by means of joining surface elements, insulating and cladding corner connections. In this case, separating can encompass methods such as stamping, cutting, shearing and laser treatment.

Advantageously the usual sheet metal processing steps such as stamping, cutting, shearing, bending, reshaping can take place on the first line for manufacturing the cassettes from sheet metal. The prefabricated cassettes can then be joined on the second line to form the surface elements in the form of the bottom wall, side wall, top wall and inner wall. Cladding elements and/or insulating elements can be attached, whilst the finished surface elements can then be joined together on the third line to form whole treatment modules.

The transport and assembly of the cassettes can take place in continuous flow production on transport tracks, such as roller tables, ball tables, brush tables, so that a crane is not required in order to move the parts. The processes can be easily automated. The cassettes can be assembled in a simple manner by the presence of positioning holes or stops, i.e. no measuring of the components is required.

DRAWING

Further advantages emerge from the following description of the drawing. Exemplary embodiments of the invention are shown in the drawings. The drawings, the description and the claims contain numerous features in combination. The person skilled in the art will also expediently consider the features individually and combine them together to form further meaningful combinations.

In the drawing, by way of example:

FIG. 22 shows an inner wall with nozzle outlets according to an exemplary embodiment of the invention;

FIG. 23 shows a nozzle assembled in an inner wall according to FIG. 22 according to an exemplary embodiment of the invention;

EMBODIMENTS OF THE INVENTION

Figure 1:
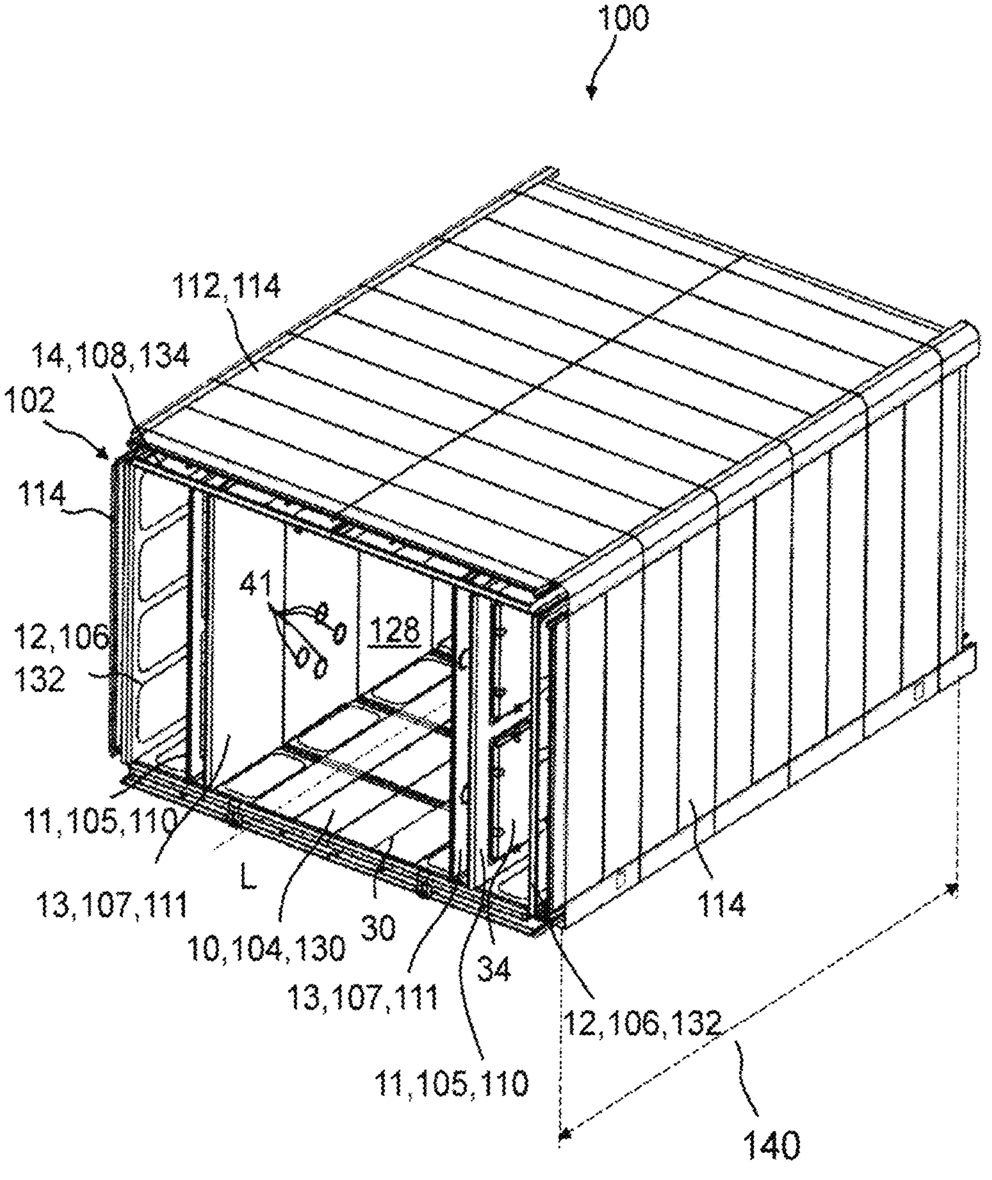
FIG. 1 shows a treatment module according to an exemplary embodiment of the invention.

Components which are the same or functionally the same are provided in the figures with the same reference numerals. The figures merely show examples and are not to be understood as limiting.

Before the invention is described in detail, it should be mentioned that it is not limited to the respective components of the device and the respective method steps, since these components and the method can vary. The terms used herein are merely intended to describe specific embodiments and are not used in a limiting manner. If the singular or indefinite article is used additionally in the description or in the claims, this also refers to a plurality of these elements unless the overall context clearly indicates otherwise.

Directional terminology used hereinafter, comprising terms such as “left”, “right”, “top”, “bottom”, “front”, “rear”, and the like serves merely for clearer understanding of the figures and is not intended to represent in any case a limitation of the generality. The components and elements shown, the design and use thereof can vary according to the considerations of a person skilled in the art and can be adapted to the respective applications.

The invention is described hereinafter by way of example for a treatment module or treatment tunnel which is suitable for a dryer tunnel for paint shops. The invention, however, can also be used for other trades.

FIG. 1 shows a treatment module 100 for a treatment tunnel 200 which can have one or more treatment modules 100 following one another according to an exemplary embodiment of the invention.

Figure 10:
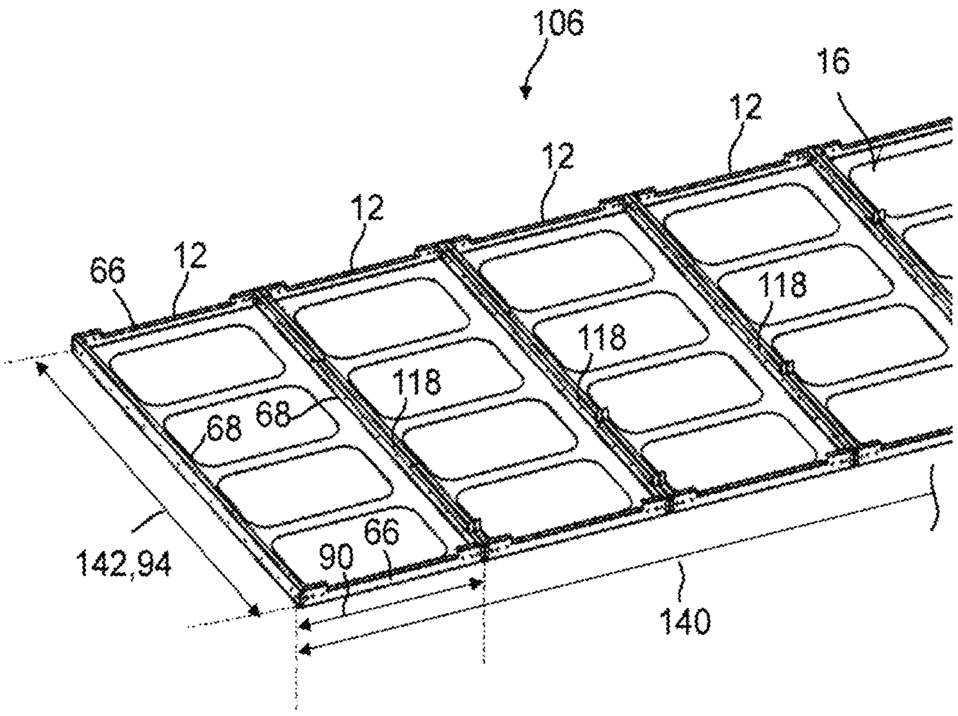
FIG. 10 shows a surface element made of prefabricated cassettes according to an exemplary embodiment of the invention.
Figure 12:
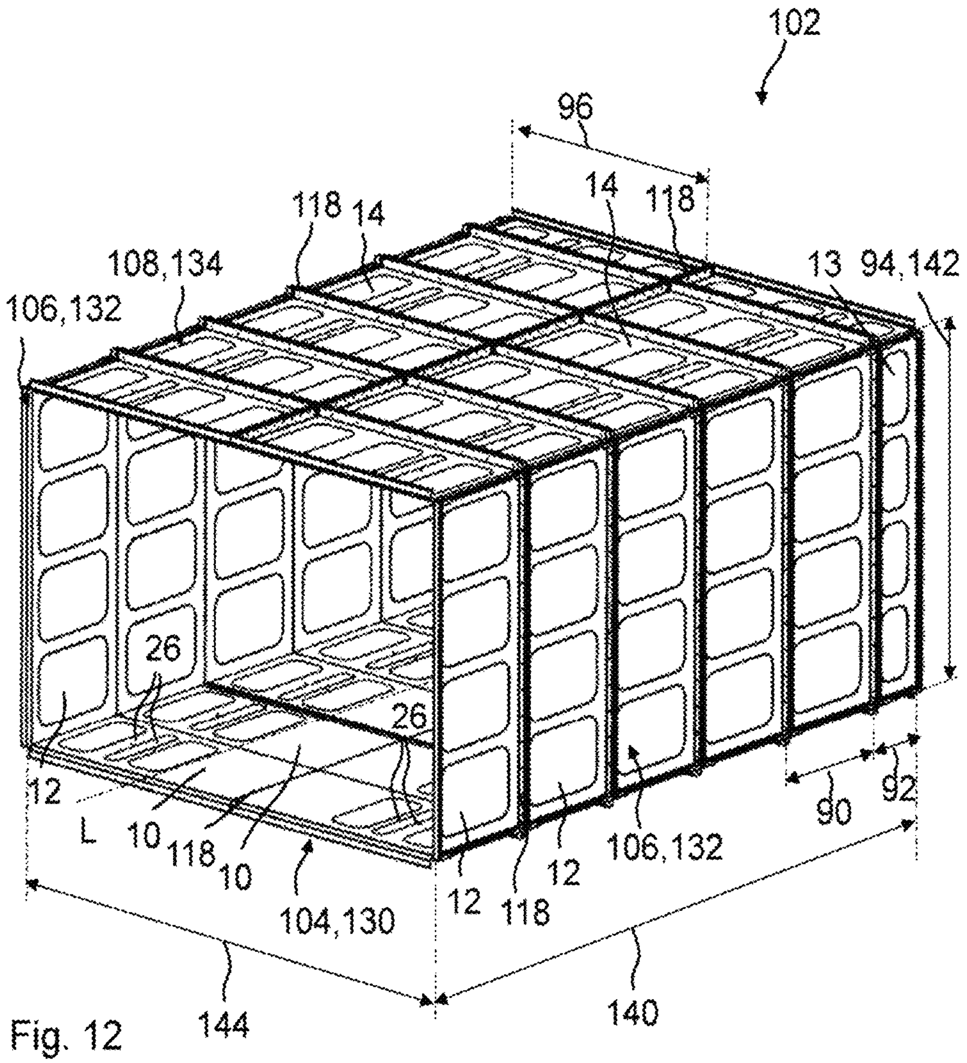
FIG. 12 shows an outer shell of an inner housing of a treatment module according to an exemplary embodiment of the invention without inner walls.

The treatment module 100 has an inner housing 102 with an extent in a longitudinal direction L. The inner housing 102 has surface elements 104, 105, 106, 107, 108. The surface element 104 forms a bottom wall 130, the surface element 106 forms side walls 132 and the surface element 108 forms a top wall 134, whilst the surface element 105 forms an inner wall 110 and the surface element 107 forms an inner wall 111. The surface elements 104, 105, 106, 107, 108, as shown in FIG. 10 or 12, have in each case a longitudinal extent 140 in the longitudinal direction L and a transverse extent 142 transversely to the longitudinal direction L.

Figure 4:
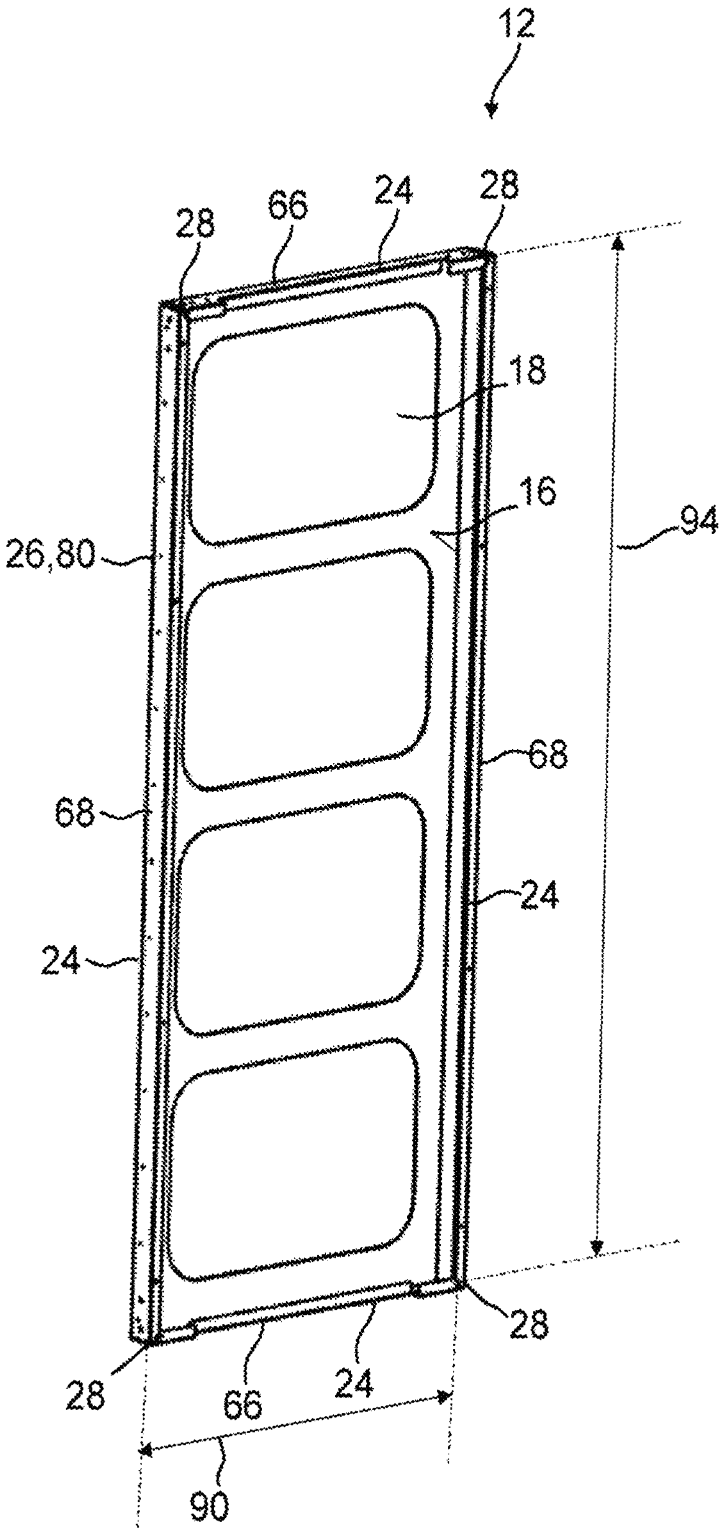
FIG. 4 shows a cassette of a side wall of the treatment module according to FIG. 1.

The surface elements 104, 105, 106, 107, 108 are formed from prefabricated cassettes 10, 11, 12, 13, 14, in particular sheet metal cassettes, which have transverse sides 66 with a cassette width 90, 92 in the longitudinal direction L and longitudinal sides 68 with a cassette length 94 transversely to the longitudinal direction L. An exemplary cassette 12 is shown in FIG. 4.

The inner walls 110, 111 are produced in the same manner as the bottom wall 130, side walls 132, and top wall 134, in each case from prefabricated cassettes 11, 13.

For the sake of clarity, elements which are respectively the same are only partially provided with reference numerals. In particular, for the sake of clarity, of the individual cassettes 10, 11, 12, 13, 14 in each case only one is referenced with a reference numeral.

The surface elements 104, 105, 106, 107, 108 are divided at least in the longitudinal direction L into a grid spacing which corresponds to at least one cassette width 90, 92 of the cassettes 10, 11, 12, 13, 14 in the longitudinal direction L.

The cassettes 10, 11, 12, 13, 14 are arranged within the surface elements 104, 105, 106, 107, 108 with their longitudinal sides 68 transversely to the longitudinal extent 140 and with their transverse sides 66 parallel to the longitudinal extent 140 of the surface element 104, 105, 106, 107, 108 and their transverse sides 66 transversely to the longitudinal extent 140 and with their longitudinal sides 68 parallel to the longitudinal extent 140 of the surface element 104, 105, 106, 107, 108.

The individual prefabricated cassettes 10, 11, 12, 13, 14 are accordingly joined together in the longitudinal extent of the surface elements 104, 105, 106, 107, 108 with their longitudinal sides 68 and arranged joined together in the transverse extent 142 of the surface elements 104, 105, 106, 107, 108 with their transverse sides 66.

Each cassette 10, 11, 12, 13, 14 also has one or more standard interfaces 80, 82, 84, 86 (shown in FIGS. 4 to 7 and 9) for connection to an adjacent cassette 10, 11, 12, 13, 14 at least in the same and/or adjacent surface element 104, 105, 106, 107, 108.

The standard interfaces 80, 82, 84, 86 for connecting cassettes 10, 11, 12, 13, 14 and/or surface elements 104, 105, 106, 107, 108 are configured according to the poka-yoke principle so as to avoid confusion. The surface elements 104, 105, 106, 107, 108 can be positioned relative to one another by means of interlocking profiles of the cassettes 10, 11, 12, 13, 14.

Inner walls 110 which have filter inserts 34, for example for filtering air blown into the interior of the inner housing 102, are arranged in the interior 128 of the inner housing 102. Further inner walls 111 which have nozzle outlets 41, for example for blowing air into the interior of the inner housing 102, are arranged in the interior. The inner walls 110, 111 are positioned and fixed in embossed portions 30 of the cassettes 10, 14, which are configured as grooves of the bottom wall 130 and top wall 134.

The inner housing 102 of the treatment module 100 is surrounded on its outer face by an outer housing 112 which is formed from individual outer cladding elements 114 arranged on the surface elements 106, 108.

Figure 2:
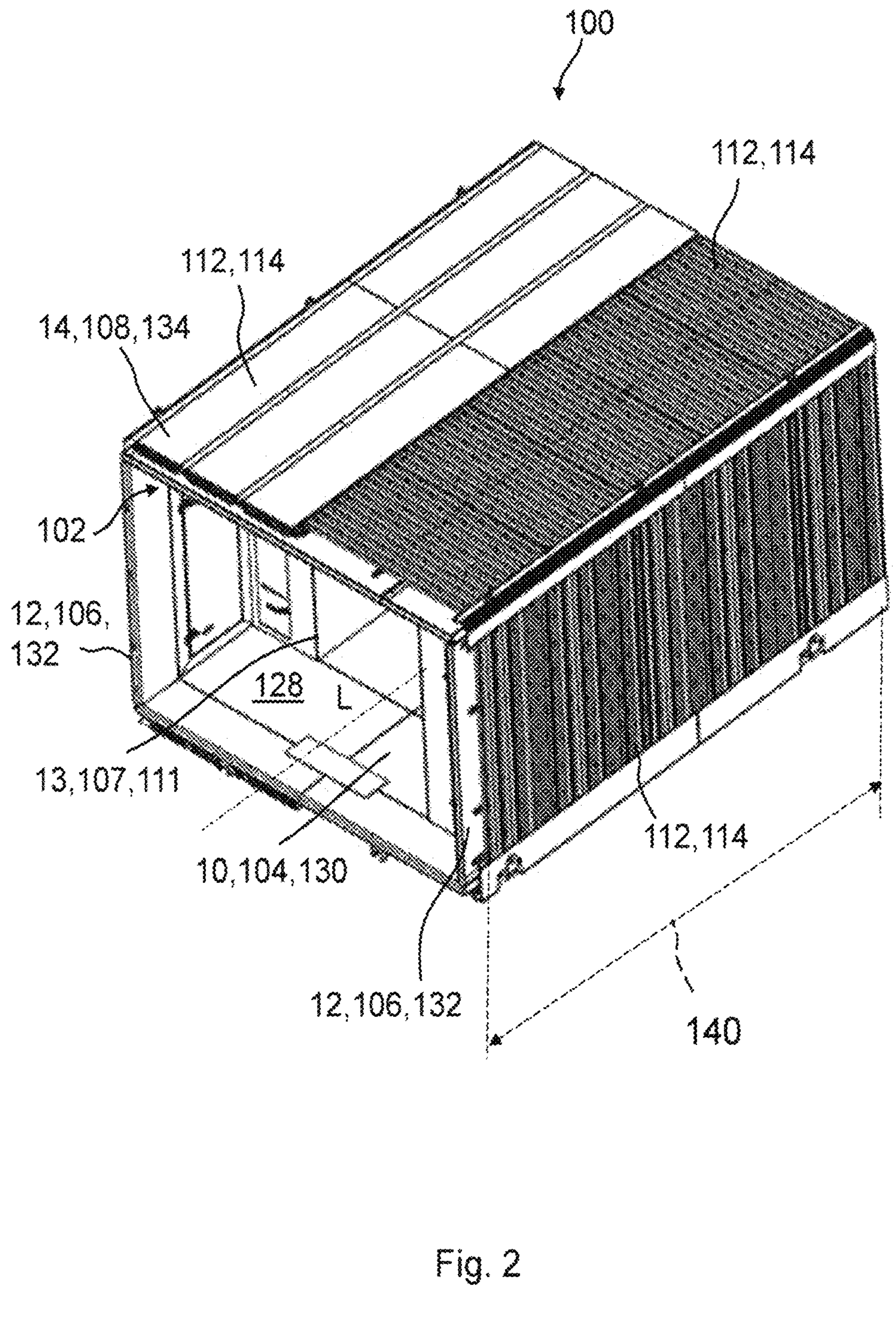
FIG. 2 shows a further treatment module according to an exemplary embodiment of the invention with profiled sheets.

FIG. 2 shows a further treatment module 100 according to an exemplary embodiment of the invention, with profiled sheets as outer cladding elements 114. By way of example, cassettes with a smooth surface and profiled sheets, for example as trapezoidal sheets, are both shown as outer cladding elements 114 in the top wall 134. The profiled sheet can be designed as a single element and can also form the entire outer cladding of the top wall 112.

The cassettes 14 with a smooth surface are arranged here within the surface element 108 with their transverse sides 66 transversely to the longitudinal extent 140 and with their longitudinal sides 68 parallel to the longitudinal extent 140 of the surface element 108, which can also be understood as a transversely divided arrangement.

In the figure, the side wall 132 is covered by a profiled sheet as an outer cladding element 114. The profiled sheet can be advantageously used as an inexpensive outer cladding element 114, in particular for a top wall 134 and/or a side wall 132.

Figure 3:
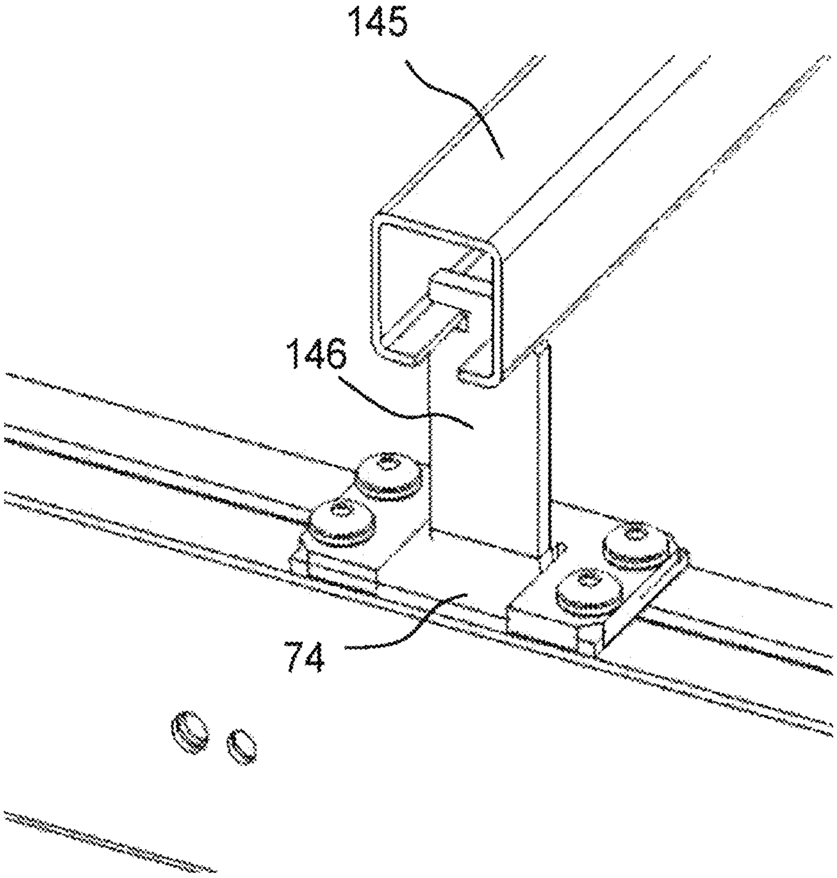
FIG. 3 shows details of a thermally insulated holder for a profiled sheet as an outer cladding element according to an exemplary embodiment the invention.

FIG. 3 shows details of an advantageous thermally insulated holder for a profiled sheet as an outer cladding element 114 according to an exemplary embodiment of the invention. According to an advantageous embodiment of the treatment module 100, holders 146 can be used as thermal insulation of one or more outer cladding elements 114 in the form of profiled sheets, said holders being thermally decoupled from the inner housing by means of an insulation 74, for example glass fibers or the like. The profiled sheet or profiled sheets can be configured on transverse struts 145 which can be configured as C-shaped carriers which are fastened to the holder 146.

In FIG. 4 a cassette 12 of a side wall 106 of the treatment module 100 according to FIG. 1 is shown. The cassette 12 has two opposing transverse sides 66 on the main surface 16 with a cassette width 90 and two opposing longitudinal sides 68 on the main surface 16 with a cassette length 94. The prefabricated cassette 12 has stiffening structures 18 embossed into its main surface 16. The cassette 12 has peripheral frame elements 24 on its outer edges for stiffening the cassette 12. The corners of the cassette 12 are formed by corner connections 28 of the frame elements 24. The outer faces of the frame elements 24 have positioning elements 26, for example in the form of bores, as standard interfaces 80 for a connection of the cassette 12 to an adjacent cassette 12 in the same or in an adjacent surface element 106. Optionally embossed portions, recesses, stamped-out portions or the like can also be provided.

Thus the cassettes 12 and surface elements 106 constructed therefrom can also be configured to be inherently stable and torsionally stiff without additional joining processes. Advantageously, a greater stability results from the cassette construction due to the doubling of the material, with in each case closed corners. The corner connections 28 can advantageously provide a mechanical locking and stiffening of the cassettes 12.

Figure 5:
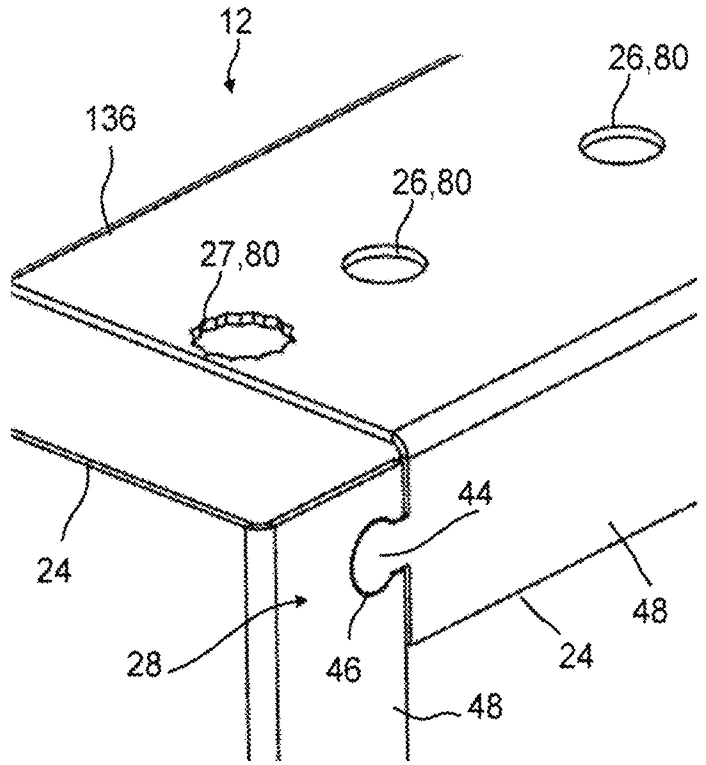
FIG. 5 shows a corner connection of the cassette according to FIG. 4.

In FIG. 5 the corner connection 28 of the cassette 12 according to FIG. 4 is shown in detail. The frame elements 24 which can be configured in the form of protruding or angled-back tabs or folded-over edges 48 are brought together and connected in the corner connection 28. The closed and locked corner connections 28 are provided both for connecting and for stiffening the angled-back frame elements 24 of the cassette 12. The corner connection 28 is fixed and locked by a locking element 44 of the one frame element 24, which engages in a recess 46 of the frame element 24 offset by 90°.

Thus the cassettes 12 and the surface elements 106 constructed therefrom can be configured to be inherently stable and torsionally stiff without additional joining processes. Advantageously, a greater stability results from the cassette construction due to the doubling of the material, with in each case closed corners. The corner connections 28 can advantageously provide a mechanical locking of the cassettes 12.

Furthermore, positioning elements 26, 27 in the form of bores 26 or a bordered through-hole 27 are arranged as standard interfaces 80 in the frame element 24, which has the locking element 44, for connecting to an adjacent cassette 12.

Figure 6:
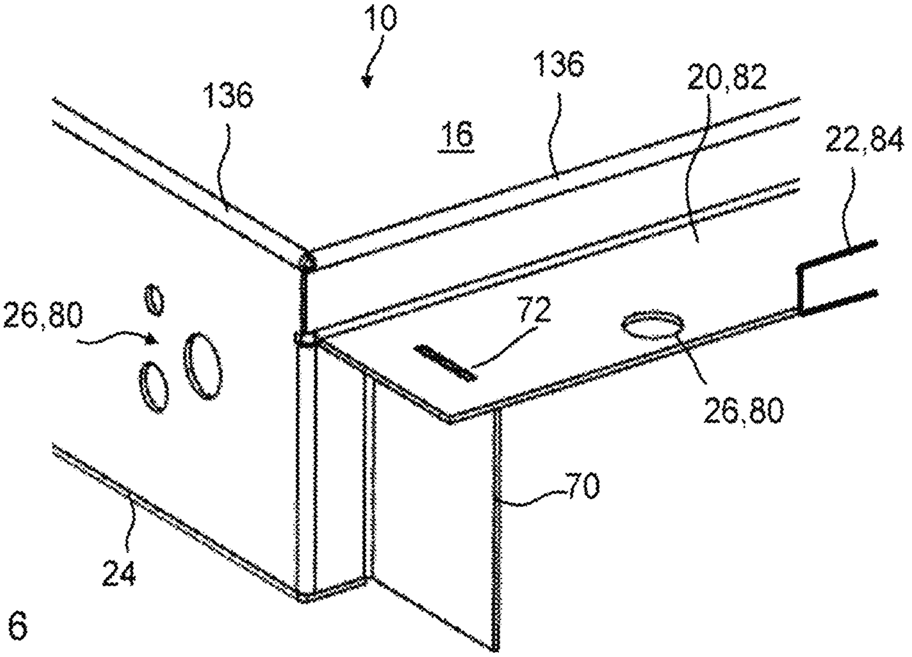
FIG. 6 shows a support strip of a cassette of a bottom wall according to an exemplary embodiment of the invention.
Figure 7:
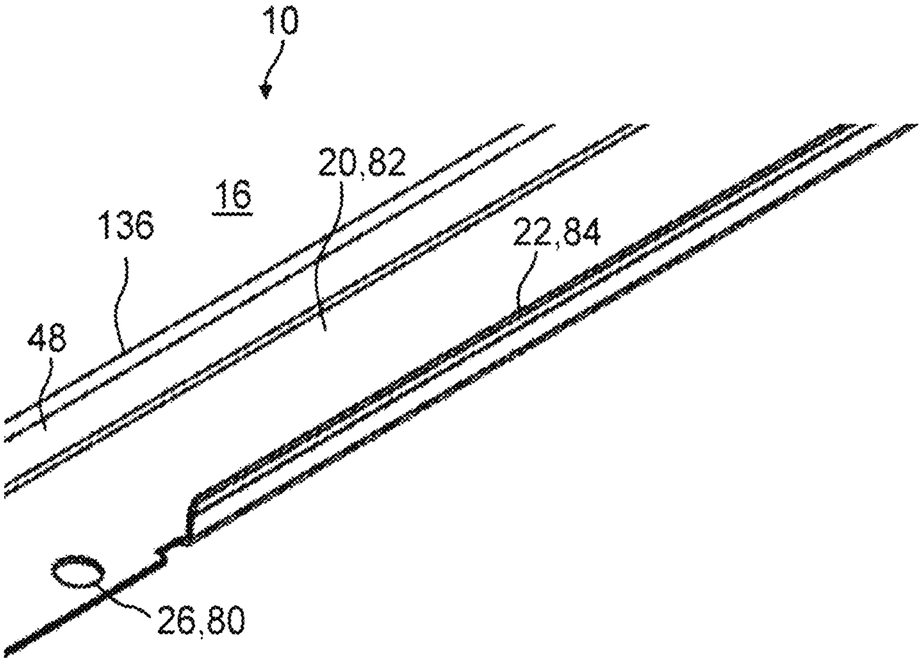
FIG. 7 shows a support strip with a pressure strip of a cassette of a bottom wall according to an exemplary embodiment of the invention.

Possible welded edges 136 for connecting to adjacent cassettes 10, 11, 12, 13, 14 are identified in FIGS. 5, 6 and 7 on the edges between a main surface 16 of the cassette 12 and the frame element 24.

In FIG. 6 a support strip 20 of a cassette 10 of a bottom wall 130 according to an exemplary embodiment of the invention is also shown in detail. The support strip 20 serves as a standard interface 82 between a side wall 132 and a bottom wall 130 and is configured, in particular, for supporting the side wall 132. The side wall 132 can be deposited on the support strip 20. The support strip 20 is configured as an angled-back tab which is supported and stiffened by a support element 70 which engages in a recess 72 of the support strip 20. The support strip 20 also has a positioning element 26 in the form of a bore as a standard interface 80. Furthermore, the support strip has a pressure strip 22 for positioning a side wall 132, the function thereof being described in the description relative to FIG. 7.

Positioning elements 26 in the form of bores as a standard interface 80 are also arranged in the frame element 24. Thus a simple and reproducible positioning of the side wall 132 is possible during the construction of the treatment module 100. Optionally, embossed portions, recesses, stamped-out portions or the like can also be provided instead of or in addition to bores.

In FIG. 7 a support strip 20 with a pressure strip 22 of a cassette 10 of a bottom wall 130 is shown according to an exemplary embodiment of the invention. The pressure strip 22 can serve as a further standard interface 84 between a side wall 132 and a bottom wall 130. When the side wall 132 is placed on the support strip 20, the side wall 132 is fixed by the pressure strip 22 in a groove formed thereby. The welded edge 136, for a permanent connection between the bottom wall 130 and side wall 132, is arranged between the main surface 16 and the support strip 20. Since in the construction of the treatment module 100 welding takes place in the region of the frame elements 24 of the cassettes 10, 11, 12, 13, 14, the heat dissipation is improved by the additional material and it leads to less heat distortion in the components. The welding brings additional stability to the construction of the treatment module 100.

Figure 8:
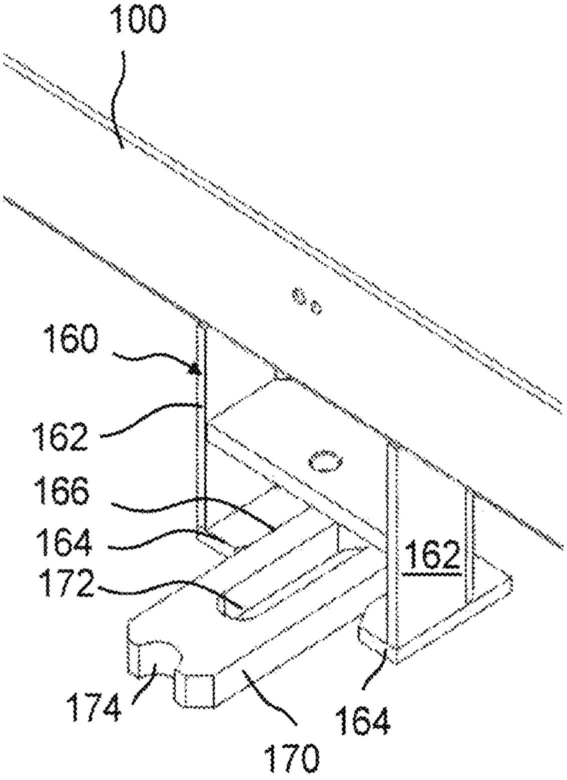
FIG. 8 shows a mounting foot for the treatment module according to an exemplary embodiment of the invention.

FIG. 8 shows an assembly arrangement for a treatment module 100 according to an exemplary embodiment of the invention. This assembly arrangement advantageously simplifies an assembly at an installation site 210. For the assembly, a loose foot can be used as a bearing foot 160 of the treatment module 100. In this case, initially a guide element 170 is mounted on the floor of the installation site 210, above which the bearing foot 160 is arranged. The bearing foot 160 stands with two L-shaped limbs 162 at the installation site 210, two plates 164 facing inwardly at the ends thereof on the floor side. An elongated opening 166 is arranged between the plates 164. The two limbs 162, together with the plates 164, encompass the guide element 170 on two sides, wherein the plates 164 can be guided by the guide element 170. Thus in the event of temperature-induced longitudinal expansion of the treatment module 100 the bearing foot 160 can be displaced simply along this guide element 170.

The guide element 170 has on the inside a slot 172 which makes it possible to weld the guide element 170 fixedly at the installation site 210. A notch 174 is arranged at the free end of the guide element 170 on the outer face, a welded seam also being able to be applied in said notch. In this manner, it can be achieved that a welded seam can be applied in a region which does not hinder a relative movement between the guide element 170 and the bearing foot 160.

Figure 9:
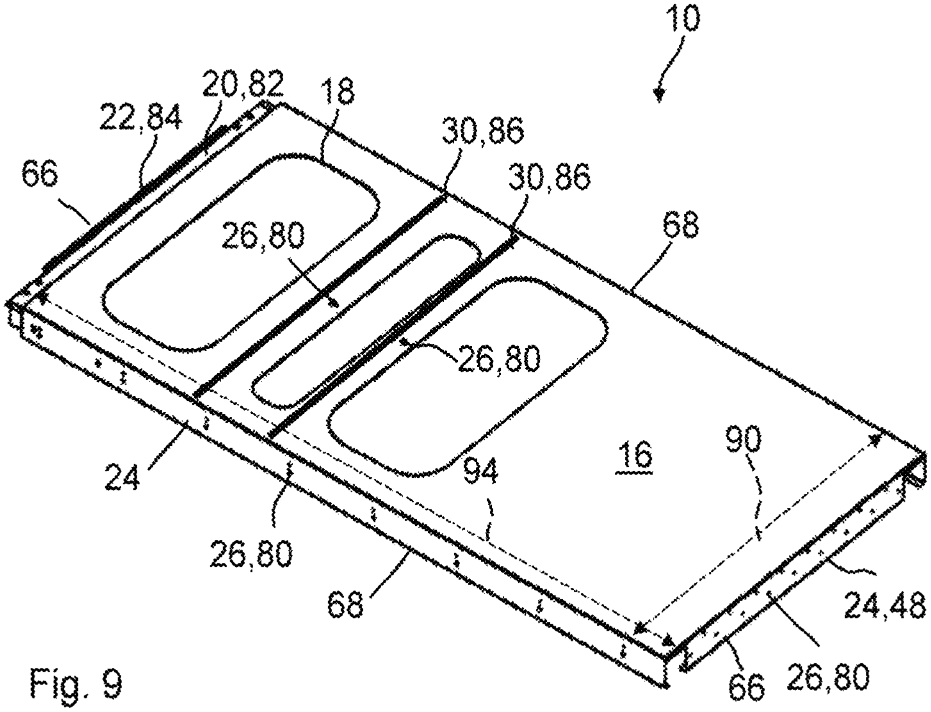
FIG. 9 shows a cassette of a bottom wall according to an exemplary embodiment of the invention.

FIG. 9 shows a cassette 10 of a bottom wall 130 according to an exemplary embodiment of the invention. The cassette 12 has two opposing transverse sides 66 on the main surface 16 with a cassette width 90 and two opposing longitudinal sides 68 on the main surface 16 with a cassette length 94. The cassette 10 has frame elements 24 with positioning elements 26 and embossed portions 30, in particular embossed portions 30 in the main surface 16 of the cassette 10, as standard interfaces 80, 82, 84, 86 for a connection of the cassette 10 to an adjacent cassette 10, 11, 12, 13, 14 in different adjoining surface elements 104, 105, 106, 107, 108. The positioning elements 26 are arranged on opposing frame elements 24 and on the main surface 16 as bores, raised portions or depressions. A transverse side 66 of the cassette 10 has a support strip 20 with a pressure strip 22 for connecting to a side wall 132. The other transverse side 66 has a further frame element 24 in the form of an angled-back tab 48 with positioning elements 26.

In the exemplary embodiment of FIG. 9, the cassette 10 is configured to be only half as long as the bottom wall 130 is wide, so that two cassettes 10 joined together on their transverse sides 66 are required for the bottom wall 130. This has the advantage that it is also possible to produce large dimensions of bottom widths, which could not be produced in this manner in conventional commercially available processing machines.

The embossed portions 30 are provided as a further standard interface 86 in the form of grooves running transversely on the main surface 16 of the cassette 10 for positioning inner walls 110, 111 of the inner housing 102. Upright inner walls 110, 111 can engage in the embossed portions 30 and can be fixed laterally thereby. The embossed portions 30 can be configured to be raised or recessed. In this regard, elements to be positioned adjacent to one another are configured in a complementary manner thereto. Embossed portions can be configured as channels/webs, or even round or angled, or can be configured as grooves.

A bottom wall 130 can have, for example as a standard interface 86 for an inner wall 110, an embossed portion 30 in a main surface 16 of the cassette 10 for the insertion of the inner wall 110. Thus a simpler assembly of the inner elements 110 of the treatment module 100 can be implemented. Alternatively or additionally, further positioning elements 26 such as bores, circular or rectangular raised portions or depressions can also be provided for positioning inner walls 110, 111. In the bottom wall 130 in FIG. 9 and in FIG. 12, such positioning elements 26 are illustrated as dark dots. Typically such raised portions or depressions can have a height of a few mm, for example 2.5 mm.

In FIG. 10 a surface element 106 made of prefabricated cassettes 12 is shown according to an exemplary embodiment of the invention. The cassettes 12 are connected together on their longitudinal sides 68 via joining seams 118 to form a large surface element 106 which can be used, for example, as a side wall 132. The surface element 106 has a longitudinal extent 140 and a transverse extent 142. In FIG. 10 the full length of the surface element 106 is not shown. In this case the transverse extent 142 of the surface element 106 corresponds to the cassette length 94 of a cassette 12, whilst the longitudinal extent 140 corresponds to a multiple of the cassette width 90 of a cassette 12, namely the number of cassettes 12 from which the surface element 106 is formed when joined-together.

The adjacent cassettes 12 can be connected, for example, along the joining seams 118 by means of at least one of the following joining methods: riveting, screwing, clinching, welding, in particular resistance welding or the like. To this end, the frame elements 24 of the individual cassettes 12 can have positioning elements 26 which in the case of joined-together cassettes 12 can be configured in a complementary manner to one another and, for example, interlock or have identical bores for connecting to rivets.

Figure 11:
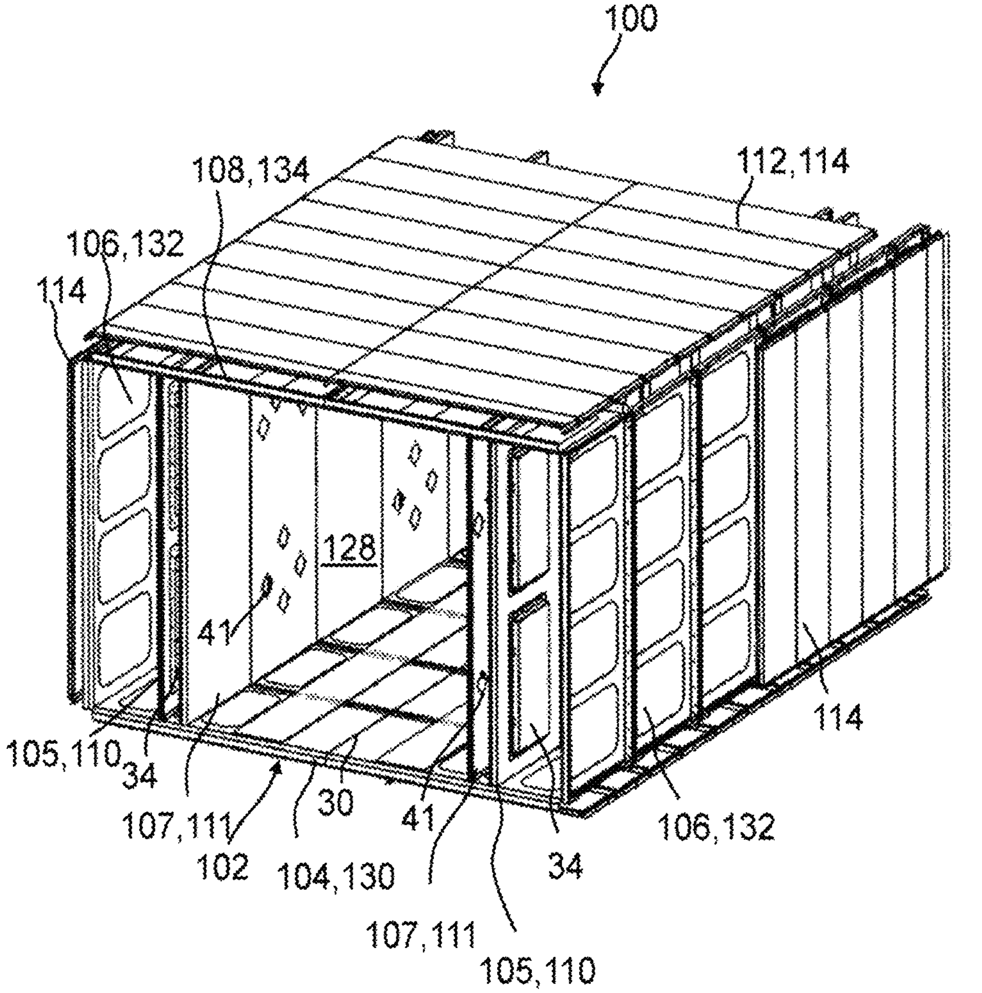
FIG. 11 shows a partially joined treatment module according to an exemplary embodiment of the invention.

FIG. 11 shows a partially joined treatment module 100 according to an exemplary embodiment of the invention, whilst in FIG. 12 the outer shell of the inner housing 102 of the treatment module 100 is shown separately without inner walls 110, 111. The inner housing 102 can advantageously be provided as a sealed space when it is sealingly closed on both front faces.

The surface elements 104, 105, 106, 107, 108 joined from individual prefabricated cassettes 10, 11, 12, 13, 14 are configured in the form of a bottom wall 130, two side walls 132 and a top wall 134 and inner walls 110, 111. The two side walls 132 are arranged on the strip 20, 82 of the bottom wall 130 and welded from the inner face of the housing 102. The top wall 134 is positioned on the two side walls 132. The outer cladding elements 114 of the outer housing 112 are partially removed in order to identify more clearly the details of the inner housing 102.

Inner walls 110, 111 are arranged with filter inserts 34 or with nozzle outlets 41 in embossed portions 30 of the bottom wall 130.

An advantageous insulation of the treatment module 100 in FIG. 11 can provide a layer of insulating material in the surface element 106 and a further layer in the outer cladding element 114. Both can have comparable thicknesses, for example 80 mm. Such an arrangement of insulating material is particularly advantageous when the outer cladding elements 114, as shown in FIG. 2, run transversely to the surface elements, i.e. with the longitudinal sides parallel to the longitudinal extent of the surface elements. Thus it can be achieved that overlapping regions of the joints of the insulating material are as small as possible.

In FIG. 12 the construction of the individual surface elements 104, 105, 106, 107, 108, made from the prefabricated cassettes 10, 12, 14, can be clearly identified. The cassettes 10, 12, 14 are in each case connected, in particular welded, via joining seams 118 running in the longitudinal direction L and transversely to the longitudinal direction L, to form the bottom wall 130, side walls 132 or top wall 134. According to the invention, the bottom wall 130, side walls 132 and top wall 134 can be produced individually from the cassettes 10, 12, 14 and then joined to form the inner housing 102.

A side wall 132 is dimensioned by way of example. The side wall 132 consists of a surface element 106 which has a longitudinal extent 140 and a transverse extent 142. The surface element 106 is joined from five similar cassettes 12 with the same cassette width 90 and one cassette 13 with a smaller cassette width 92. This results in the longitudinal extent 140 of the surface element 106, whilst the transverse extent 142 results from the cassette length 94 of a cassette 12.

The bottom wall 130 and top wall 134 are similarly configured in a modular manner from prefabricated cassettes 10, 14. In this case, the transverse extent 144 of the surface elements 104, 108 results from the double cassette length 96 of the cassettes 10, 14 since in each case two cassettes 10, 14 are joined together transversely to the longitudinal direction L along the joining seam 118. The longitudinal extent 140 of the bottom wall 130 and the top wall 134 in this example is equal to the longitudinal extent 140 of the side walls 132, so that the front side and rear side of the treatment module 100 in the longitudinal direction L terminate at the same point. Optionally, the longitudinal extent of the individual surface elements 104, 105, 106, 107, 108 can be different. Preferably, the longitudinal extents of the surface elements 104, 105, 106, 107, 108 of connection modules can be configured in a complementary manner thereto.

Figure 13:
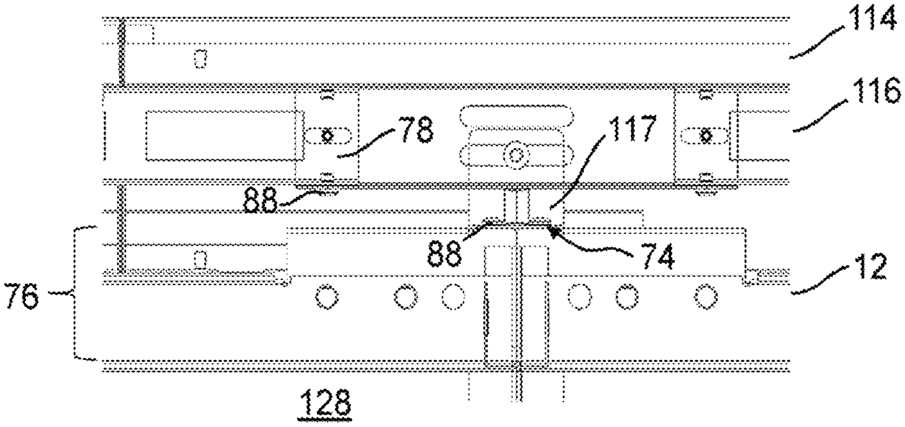
FIG. 13 shows a cross section through a cassette with outer cladding and insulation according to an exemplary embodiment of the invention.
Figure 14:
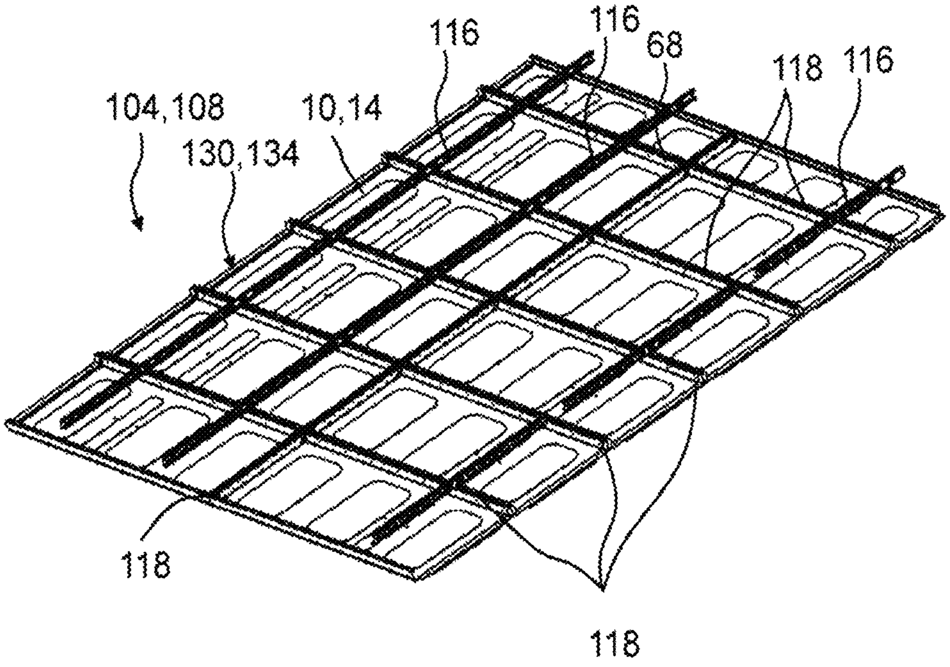
FIG. 14 shows a surface element with suspension rails for outer cladding elements according to an exemplary embodiment of the invention.

FIG. 13 shows a cross section through a cassette 12 with outer cladding 114 and insulation 76 according to an exemplary embodiment of the invention, whilst in FIG. 14 a surface element 106 with suspension rails 116 for an outer cladding element 114 is shown according to an exemplary embodiment of the invention.

Advantageously thermally decoupled holders 116, in particular suspension rails 116 for outer cladding elements 114, can be arranged on the inner housing 102 of the treatment module 100. These suspension rails 116 serve for receiving the outer cladding elements 114 which remain in situ and do not move in spite of possible thermally induced movements of the inner housing 102. Moreover, the outer cladding elements 114 are not negatively affected by high temperatures of the inner housing 102 which might occur.

Suspension rails 116 which are perforated and thermally decoupled by insulating material 74, such as for example glass fiber material, for the outer cladding 114 advantageously permit the thermal decoupling of the outer housing 112 of the treatment module 100. The suspension rails 116 can be slidably mounted so that an inner wall of the inner housing 102 of the treatment module 100 can expand without displacing the suspension rails 116 and thus the outer wall. These measures advantageously lead to less heat transfer and fewer heat losses.

Side wall cassettes 12 can be filled with insulation 76, for example over a depth of 70 mm to 80 mm, which corresponds to a typical depth of the frame elements 24 of the cassettes 12. Optionally, a further layer of insulation (not shown) can also be provided between the suspension rails 116. Holders 117 for receiving the suspension rails 116 are attached by means of rivets 88 to the cassettes 12, wherein insulating material 74, such as for example glass fiber material, for the thermal decoupling of the holder 117 from the inner housing 102 is arranged between the holder 117 and the cassette 12. The interior 128 of the inner housing 102 is marked in FIG. 13 for orientation. Connecting elements 78 of the suspension rails 116 can also be fixed by rivets 88 to the cassettes 12.

FIG. 14 shows a surface element 104, 108, as can be used for a bottom wall 130 (surface element 104) or top wall 134 (surface element 108). The surface element 104, 108 consists of individual cassettes 10 (for a bottom wall 130) or 14 (for a top wall 134). Suspension rails 116 are arranged on the outer face. In this case, the suspension rails 116 can run along the longitudinal sides 68 of the cassettes 10, 14 and transversely thereto. For reasons of clarity, reference numerals are shown only by way of example. The outer cladding elements 114 can be expediently assembled individually on the suspension rails 116. The bottom wall 130 and top wall 132 can preferably be provided with insulation in the same manner as the side outer wall 106.

Figure 15:
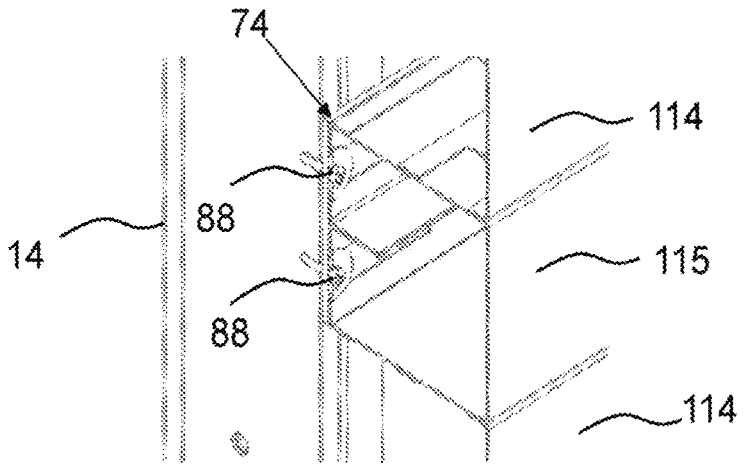
FIG. 15 shows a section through a cassette with outer cladding and insulation according to a further exemplary embodiment of the invention.
Figure 16:
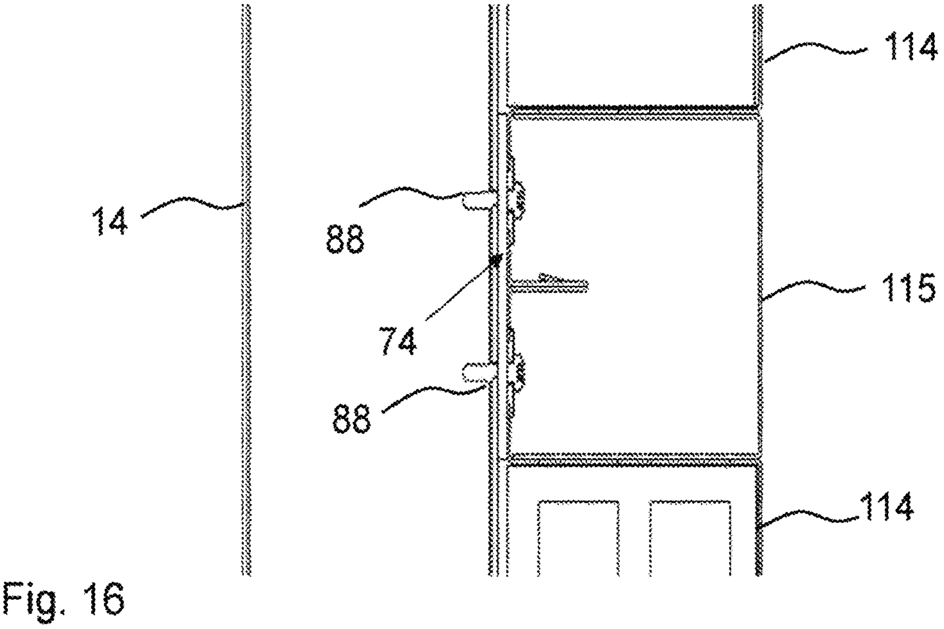
FIG. 16 shows a plan view of the section according to FIG. 15.

FIGS. 15 and 16 show a further exemplary embodiment of the invention as a section through a cassette 14 with outer cladding and insulation, wherein FIG. 15 shows a perspective view of a sectional arrangement and FIG. 16 shows a plan view of the section according to FIG. 15.

The insulating material 74 is arranged between the cassette 14 and the holder with the rivets 88, not denoted further, so that the thermal bridge is interrupted. The insulating material 74 is, for example, glass fiber material or the like. In this embodiment, heat distortion can be compensated by slots in the outer cladding elements 114. Further insulating material, not denoted further, having a greater thickness, for example 80 mm, is arranged in the cavity of the outer cladding elements 114. Similarly, further insulating material, having a greater thickness, for example 80 mm, can be arranged in the cavity of the cassette 14. It is advantageous if the outer cladding elements 114, as shown in FIG. 2, run transversely to the surface elements, so that the overlapping regions of the joints of the insulating material are as small as possible. In this arrangement, the holder with the rivets 88 can be covered with a cover plate 115 which is arranged between two outer cladding elements 114 and is aligned therewith.

Figure 17:
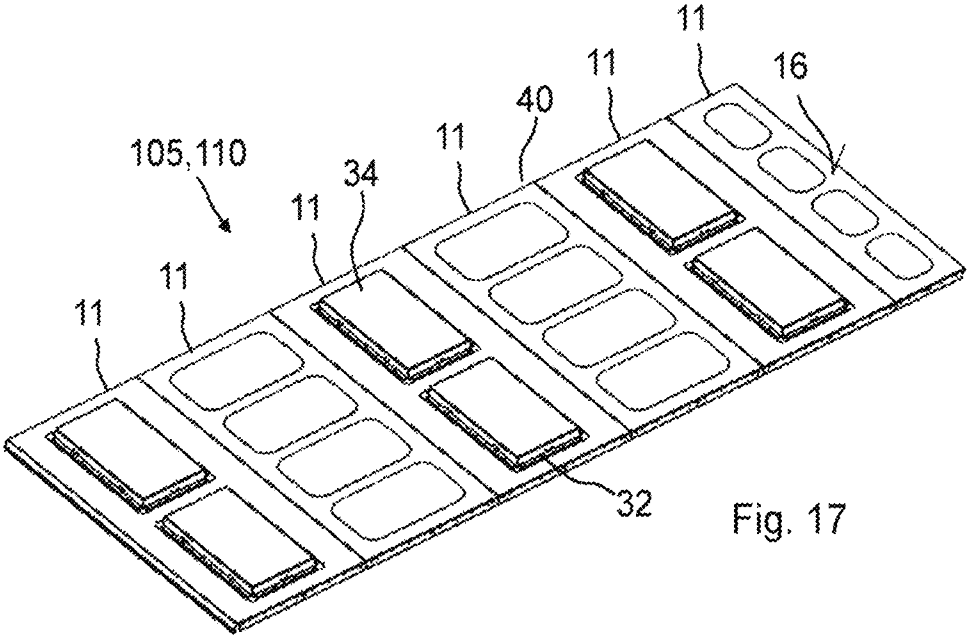
FIG. 17 shows an inner wall with filter inserts according to an exemplary embodiment of the invention.
Figure 18:
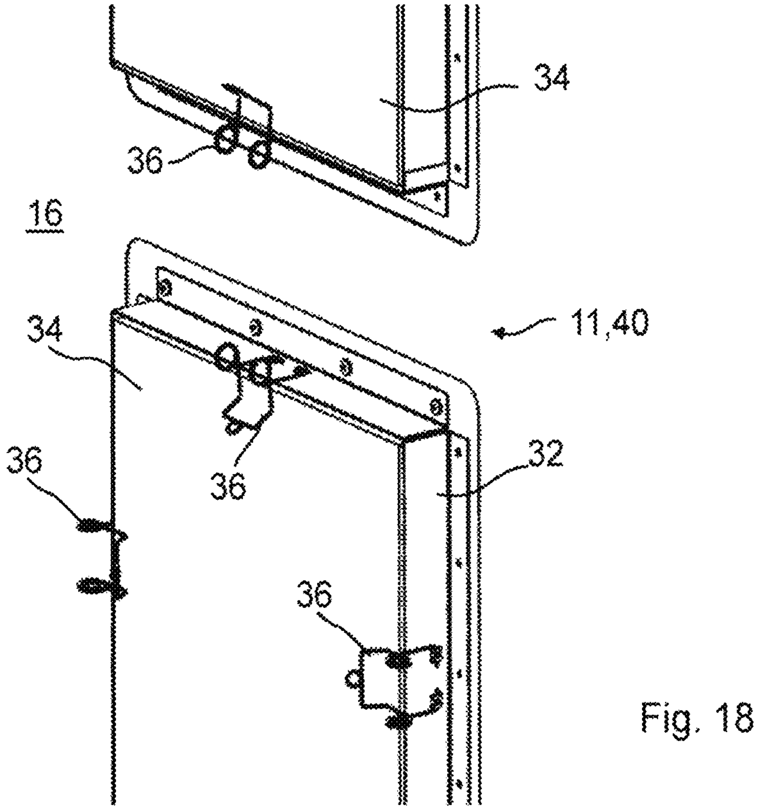
FIG. 18 shows filter inserts according to FIG. 17 in an enlarged view.
Figure 19:
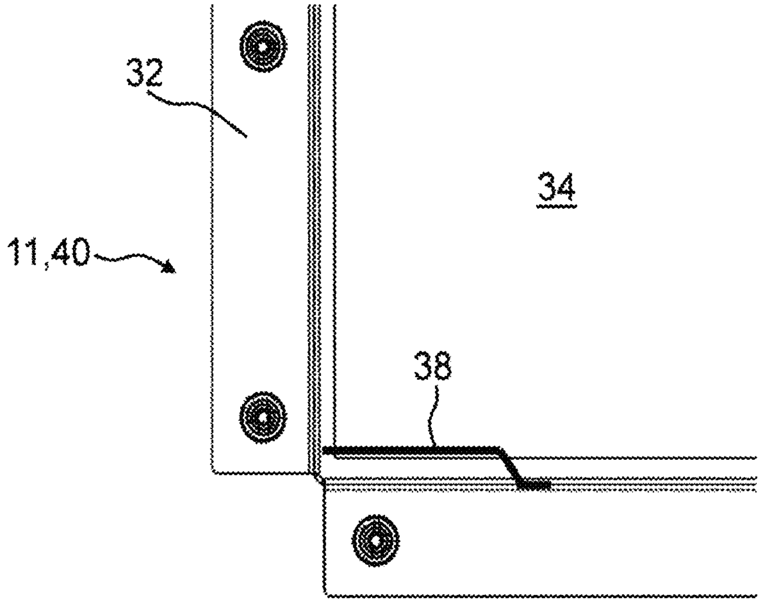
FIG. 19 shows details of the fastening of a filter insert according to FIG. 17.

FIG. 17 shows an inner wall 110 with filter inserts 34 according to an exemplary embodiment of the invention, whilst in FIG. 18 filter inserts 34 according to FIG. 17 can be identified in an enlarged view. FIG. 19 shows details of the fastening of a filter insert according to FIG. 17, whilst details of the fastening of a further filter insert according to FIG. 17 are shown in FIG. 20.

The inner wall 110, which can be formed as a single cassette wall 40 which is advantageously made up of cassettes 11 of the same dimension as the corresponding side walls 132 of the treatment module 100, is provided for receiving one or more filter frames 32, wherein filter inserts 34 are fixed or fixable by means of clamps 36, 38 in the filter frame 32. The cassette wall 40 in FIG. 17 has six such filter inserts 34 which in each case are positioned adjacent to one another in arrangements of two filter inserts 34. In this case, filter inserts 34 are arranged only on every second cassette 11.

Figure 20:
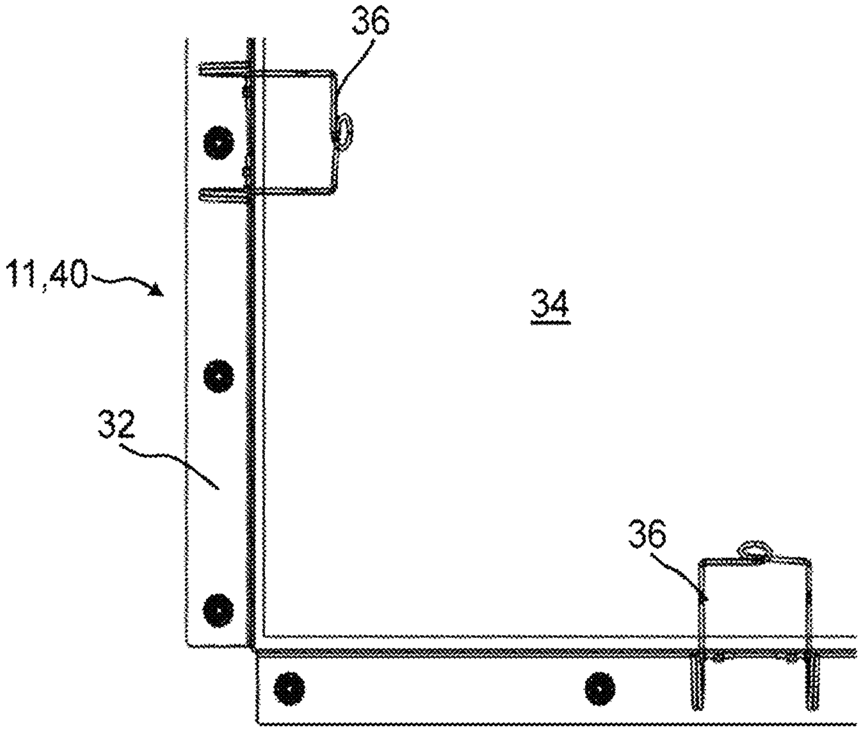
FIG. 20 shows details of the fastening of a further filter insert according to FIG. 17.

The filter inserts can be fixed in the filter frame 32 in each case by a plurality of clamps 36, as shown in particular in FIGS. 18 and 20. This clamp arrangement is substantially provided for larger filter inserts, which are arranged from an outer face of the inner wall 110.

In this manner, it is advantageously possible to use a universal filter frame 32. As a result, a counter frame can advantageously be dispensed with on the filter insert 34. Such an integrated fastening mechanism without a counter frame for filter inserts 34 can advantageously make it possible to use different filter sizes. The universal filter frame 32 with embossed portions can receive, for example, small filter inserts which are clamped from an inner face of the cassette wall 40 by clamps 38, whilst large filter inserts 34 can be clamped from an outer face by clamps 36.

In FIG. 19 a variant is shown with smaller filter inserts 34 which are preferably held from an inner face of the inner wall 110 with an alternative embodiment of clamps 38 in the filter frame 32.

In FIG. 20 the variant is shown with larger filter inserts 34 which are preferably held from the outer face of the inner wall 110 with the clamps 36 in the filter frame 32.

Figure 21:
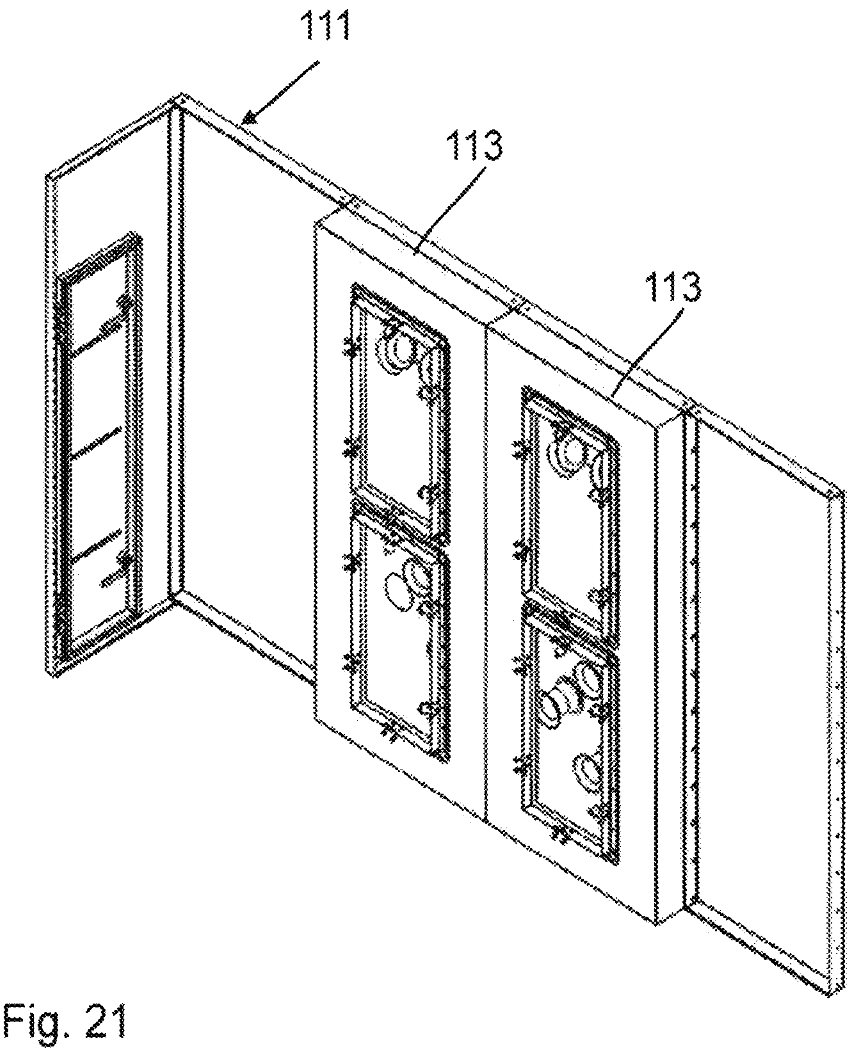
FIG. 21 shows an inner wall with filter boxes according to a further exemplary embodiment of the invention.

FIG. 21 shows, according to a further exemplary embodiment of the invention, an inner wall 111 with filter boxes 113 which are used alternatively or additionally to a filter wall with filter inserts as shown in FIGS. 19, 20. Advantageously, a filter box 113 can extend over the entire cassette width and cassette height. This permits easier accessibility to the cassettes inside the treatment module 100.

FIG. 22 shows an inner wall 111 with nozzle outlets 41 according to an exemplary embodiment of the invention, whilst in FIG. 23 a nozzle 42 is shown mounted in an inner wall 111 according to FIG. 22.

The inner wall 111, which advantageously can be formed as an individual cassette wall 40 from cassettes 13 of the same dimension as the corresponding side walls 132 of the treatment module 100, is provided for receiving one or more nozzles 42. To this end, the inner wall 111 has a plurality of nozzle outlets 41 in the main surface 16 of the cassette wall 40. In this case, the nozzle outlets 41 are arranged only on every second cassette 13, according to the arrangement of the filter inserts 34 in the cassettes 11.

As can be identified in FIG. 23, the interface 43 between the inner wall 111 and a nozzle 42 is configured as a tongue/groove holder 43. To this end, a plurality of locking tabs of the tongue/groove holder 43 are arranged on the cassette wall 40 around the nozzle outlet 41, the nozzle 42 being able to be inserted therein from the side with a flange 45 without the use of additional tools. As a result, the nozzle can be locked automatically on the cassette wall 40.

In this manner, it is advantageously possible to carry out a required change of the nozzles 42 more rapidly and without the use of tools. Thus it is possible to install a nozzle without the use of tools by means of cassettes 10 with integrated holders 43 and locking.

Figure 24:
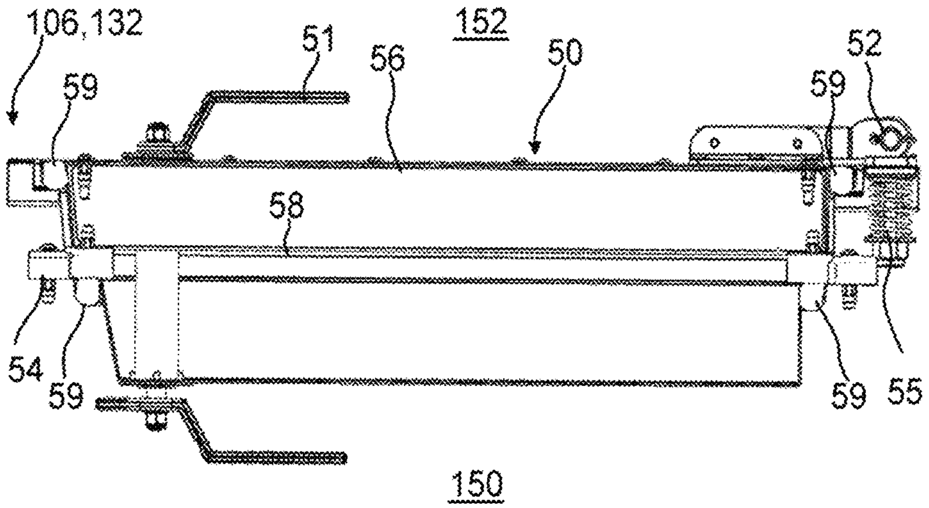
FIG. 24 shows a plan view of a cross section through a door segment according to an exemplary embodiment of the invention.

FIG. 24 shows a cross section through a door segment 50 according to an exemplary embodiment of the invention. The door segment 50 can be arranged in a side wall 132 as part of, or as a replacement for, a cassette 12 and can represent a connection between the hot inner region 150 of the inner housing 102 and the cold outer region 152. The door segment 50 is provided so as to be thermally decoupled in a side surface element 106. At least one door hinge 52 of the door segment 50 has an adjustable spring force of a spring 55. The door segment 50 can be opened and closed from outside and inside by a control lever 51.

The additional thermal decoupling of the door segment 50 can advantageously be implemented by a divided door frame 54 with an additional sealing lip 58, for example made of glass fiber material, a two-part thermally decoupled door leaf 56, a double seal 59 on the door leaf 56 and a door hinge 52 with an adjustable spring mechanism. The intermediate space between the door frame 54 and the door leaf 56 can be advantageously divided by the sealing lip 58 made of glass fiber material. In this manner, it is possible to reduce the heat losses and heat bridges on the door segment 50 and the suspension of the outer cladding 114. An improved seal of the door segment 50 results from an additional spring 55 on the door hinge 52. Thus the contact pressure can be adjusted in a targeted manner so that the door segment 50 is sealingly closed over the entire periphery. Less wear of the door seal 59 occurs since two seals 59 are mounted in the door leaf 56.

Figure 25:
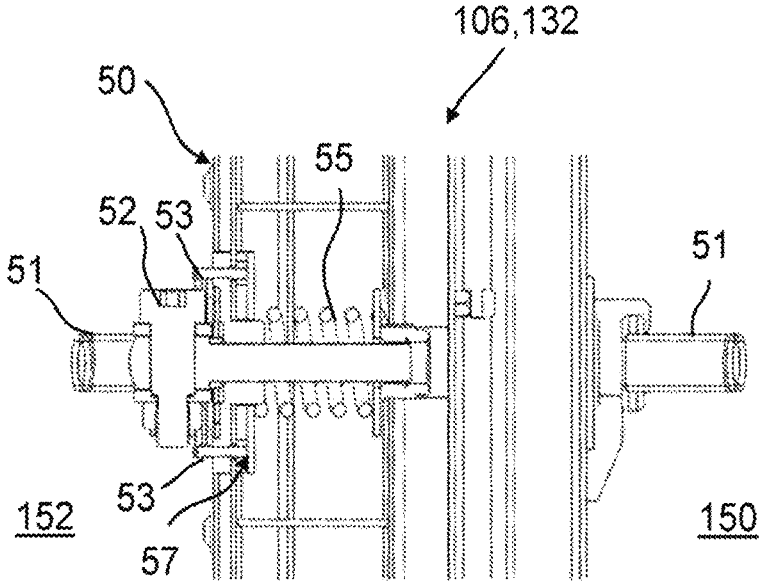
FIG. 25 shows a plan view of a section through a door segment according to a further exemplary embodiment of the invention.
Figure 26:
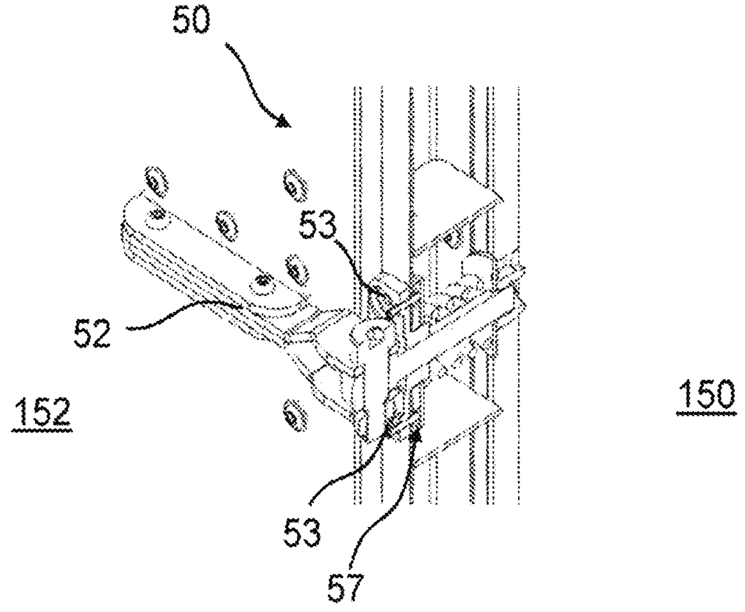
FIG. 26 shows a perspective view of the section through the door segment according to an exemplary embodiment of the invention.

FIG. 25 shows a plan view of a section through a door segment 50 according to a further exemplary embodiment of the invention. FIG. 26 shows a perspective view of the door segment 50 in section. The door segment 50 can be arranged in a side wall 132 as part of, or as a replacement for, a cassette 12 and represent a connection between the hot inner region 150 of the inner housing 102 and the cold outer region 152. The door segment 50 is provided to be thermally decoupled in a lateral surface element 106. In this case at least one door hinge 52 of the door segment 50 has an adjustable spring force. The door segment 50 can be opened and closed from outside and inside by a control lever 51. The spring force can be adjusted by a pressure plate 57 via an adjusting screw 53, which can compress the spring 55 to a greater or lesser extent. To this end, adjusting screws can be actuated from outside from the cold side 152.

The remaining embodiment regarding thermal insulation, sealing and the like can correspond to the embodiment of the door segment 50 of FIG. 24.

Figure 27:
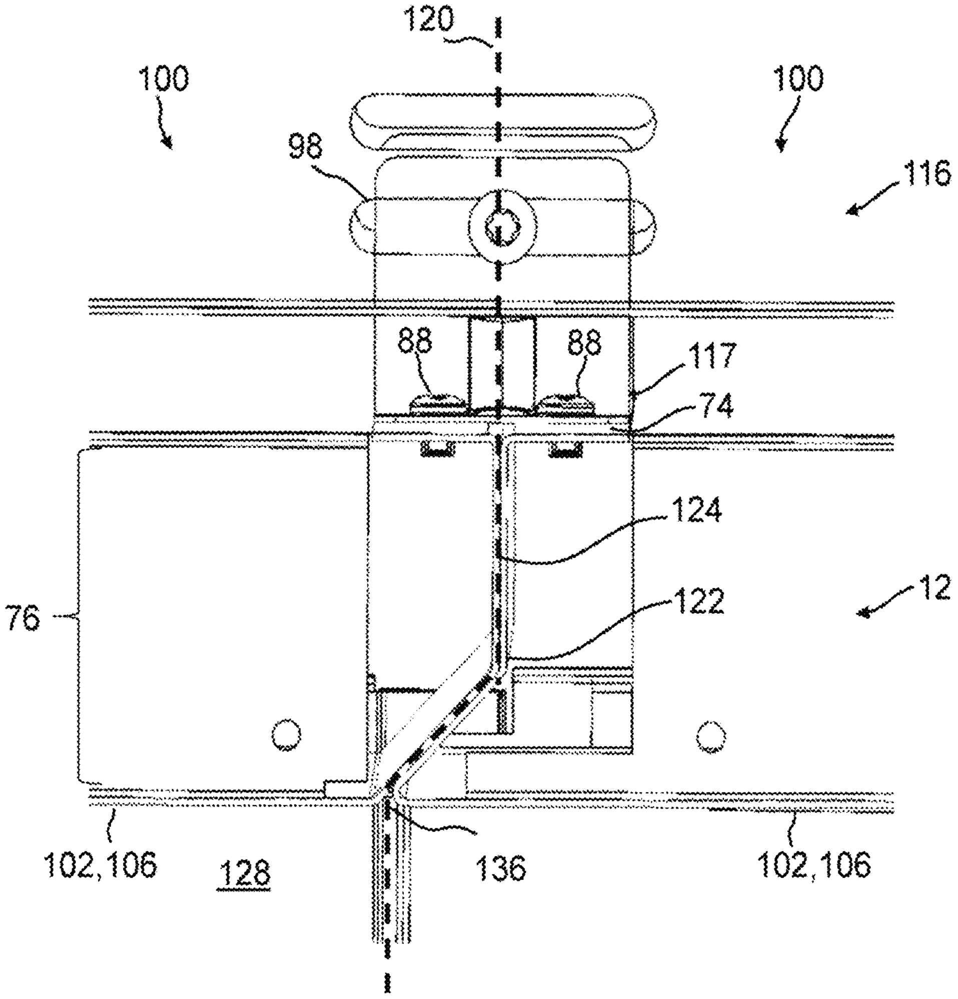
FIG. 27 shows details of a fixed connection of two treatment modules with an integrated welding frame according to an exemplary embodiment of the invention.

FIG. 27 shows details of a fixed connection of two treatment modules 100 with an integrated welding frame 122 according to an exemplary embodiment of the invention. In FIG. 27 the module-connecting interface 120 is illustrated as a dashed line.

An integrated docking geometry, in particular a welding frame 122 integrated in a lateral surface element 106, is provided for the assembly of treatment module 100 to treatment module 100, whereby an additional welding frame can be dispensed with for producing a module-module connection. Therefore, more stable edges 124 are present at the connecting joints of the two treatment modules 100. Additional covers in the region of connecting points when connecting treatment module 100 to treatment module 100 can thus be dispensed with.

The docking geometry integrated in the treatment module 100 facilitates the assembly of treatment module 100 to treatment module 100, in particular when constructed, for example, in situ at the customer's premises.

Cassettes 12 of the treatment modules 100, which are shown by way of example in FIG. 27, can be filled with insulation 76, for example over a depth of 70 mm to 80 mm, which corresponds to a typical depth of the frame elements 24 of the cassettes 12. Optionally, a further layer of insulation (not shown) can also be provided between the suspension rails 116. Holders 117 are attached by means of rivets 88 to the cassettes 12, for receiving suspension rails 116 for outer cladding elements 114, wherein insulating material 74, such as for example glass fiber material, is arranged between the holder 117 and the cassette 12 for the thermal decoupling of the holder 117 from the inner housing 102. The suspension rails 116 have slots 98 for the mechanical decoupling of the outer cladding elements 114 from the inner housing 102. The welded edge 136 is accessible from the interior 128 of the treatment modules 100.

Figure 28:
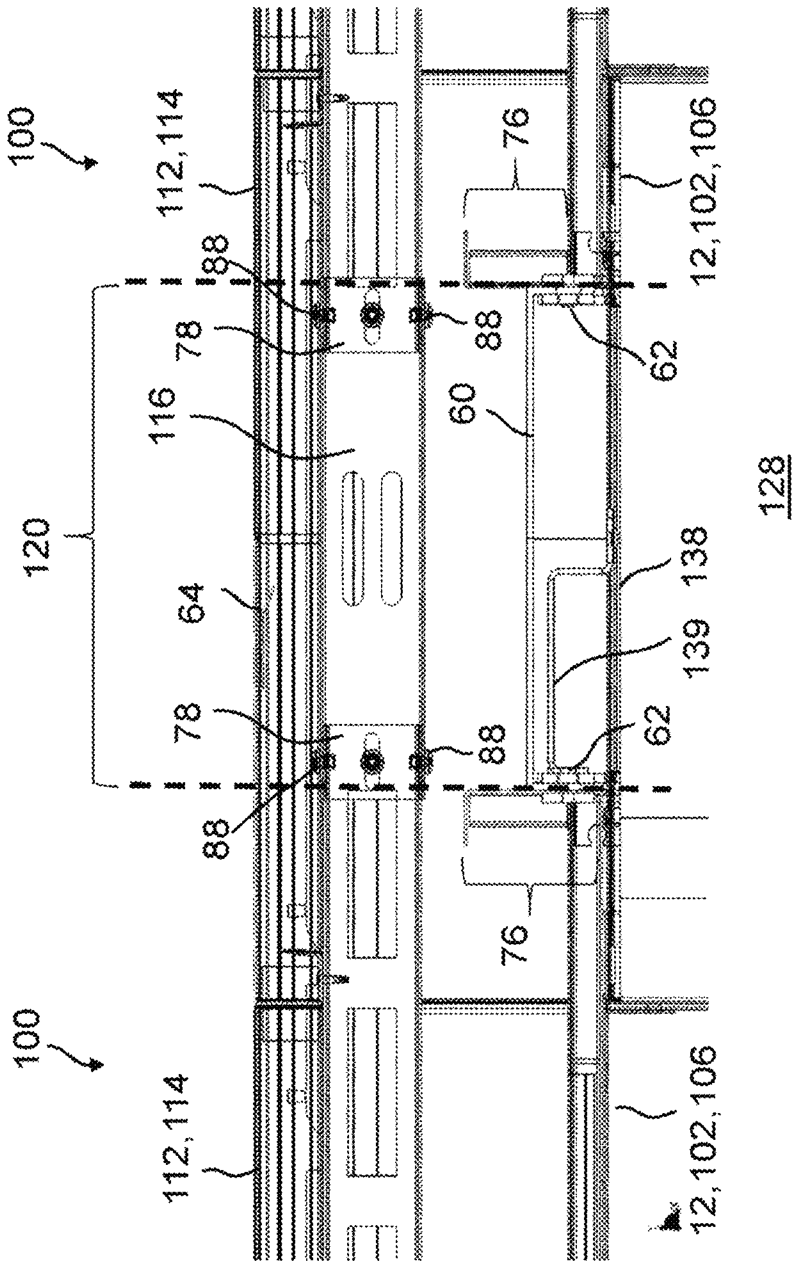
FIG. 28 shows details of a flexible connection of two treatment modules according to an exemplary embodiment of the invention.

FIG. 28 shows details of a flexible connection of two treatment modules 100 according to an exemplary embodiment of the invention. The module-connection point 120 is illustrated.

The inner housing 102 of the treatment module 100, which is joined from prefabricated cassettes 12, is surrounded by a thermally decoupled outer housing 112. In particular, in the event of a thermally induced length change, the inner housing 102 is arranged so as to be independently movable in the longitudinal direction L. A thermal compensator 60 in this case is provided for a flexible connection of treatment module 100 to treatment module 100. A telescopic connection 64 serves for connecting at least two outer cladding elements 114.

The compensator 60, for compensating for thermally induced changes in mechanical dimensions, can be preassembled in the treatment module 100 and screwed from the inner face of the treatment module 100, for example at screwing points 62. This is possible due to the easy accessibility in the treatment module 100. As a result, treatment modules 100 can be joined together in a simpler manner. Thus possibly required maintenance of the compensator 60 can also be carried out more easily. Furthermore, in such an arrangement of the compensator 60 it is possible to avoid a cross-sectional reduction in the channels of the treatment module 100, whereby there is less pressure loss from blown-in air in the treatment module 100.

A simpler assembly of outer cladding elements 114 can be achieved by means of the telescopic connection 64. As a result, a prefabrication of outer cladding elements 114 and an improved replaceability of damaged cladding parts 114 is possible. Thus cost-intensive work of the installation in situ at the customer's premises can be transferred to the production of the treatment module 100 or treatment tunnel 200.

The cassettes 12 of the surface elements 106 of the inner housing 102 are filled, as in the exemplary embodiment of FIG. 27, with, for example, 70 mm to 80 mm thick insulation 76. Optionally, a further layer of insulation (not shown) can also be provided between the suspension rails 116. The suspension rails 116 for the outer cladding elements 114 are fixed with holders 78 to the cassettes 12 by means of rivets 88. The outer cladding elements 114 of the outer cladding 112 are also arranged by means of rivets 88 on the holders 78. Outer cladding elements 114 of adjoining treatment modules 100 are connected via the telescopic connection 64.

The compensator 60 which can be configured, for example, from textile fabric is screwed via the screwing points 62 to the cassettes 12 of the two treatment modules 100. The screwing points 62 are accessible during assembly from the interior 128 of the inner housing 102. After connecting the two treatment modules 100, the connecting point of the compensator 60 can be covered and thus protected by a cover plate 138. The cover plate 138 can be fixed via the holder 139 which is arranged on a cassette 12.

Figure 29:
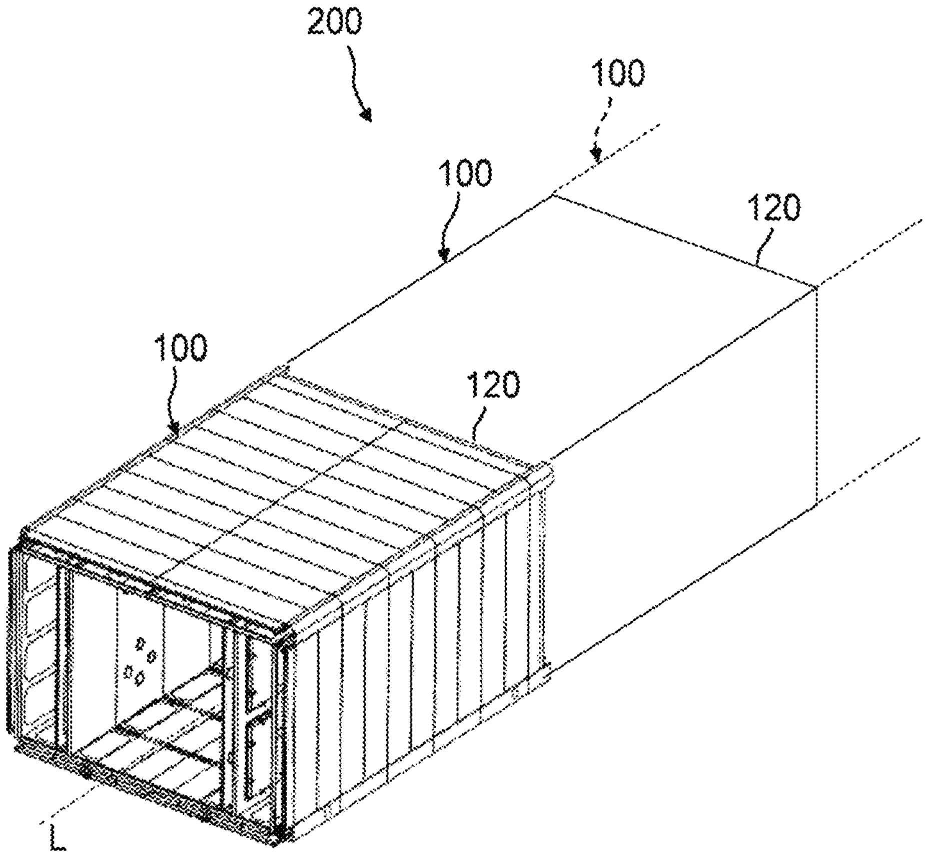
FIG. 29 shows a treatment tunnel according to an exemplary embodiment of the invention.

FIG. 29 shows a treatment tunnel 200 according to an exemplary embodiment of the invention. The treatment tunnel 200 comprises one or more treatment modules 100 following one another. In FIG. 29 a treatment module 100 is shown with two further treatment modules 100 which are indicated schematically. The module-connecting interface 120 is illustrated along the connection of two respective treatment modules 100.

An integrated docking geometry, in particular a welding frame 122 integrated in a surface element 104, 105, 106, 107, 108 as shown in FIG. 27, is provided for the assembly of treatment module 100 to treatment module 100.

Due to the integrated welding frame 122, for example, it is possible to dispense with an additional welding frame for the assembly of different treatment modules 100 in an arrangement following one another. In this manner, it is possible to implement a treatment tunnel 200 with successive treatment modules 100 in order to connect different production steps in a suitable manner, for example in a paint shop for vehicle bodies. The modular construction makes it easier to set up the treatment tunnel 200 in a production system in situ at the customer's premises.

Figure 30:
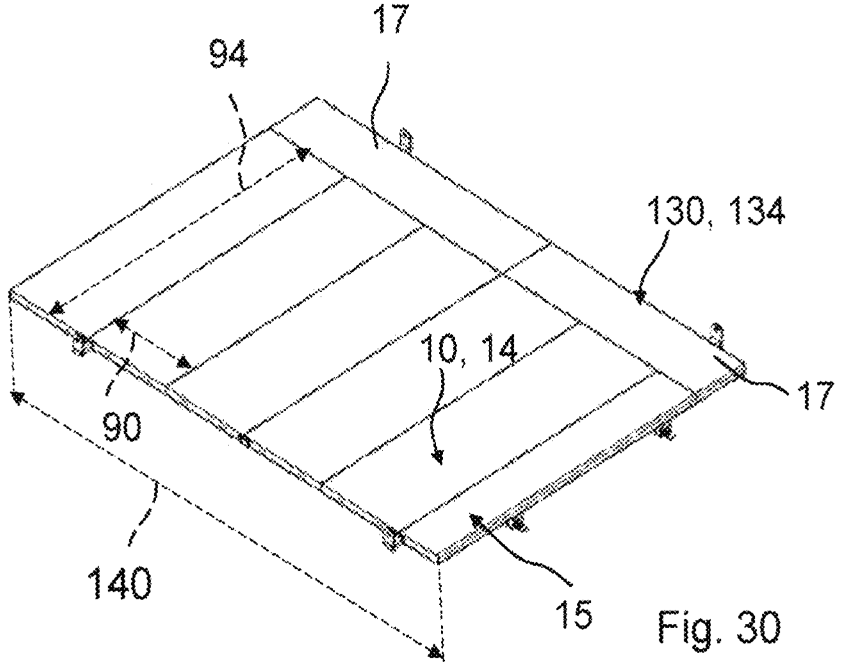
FIG. 30 shows a bottom wall or top wall according to a further exemplary embodiment of the invention with two cassettes arranged transversely on a composite structure of cassettes.
Figure 31:
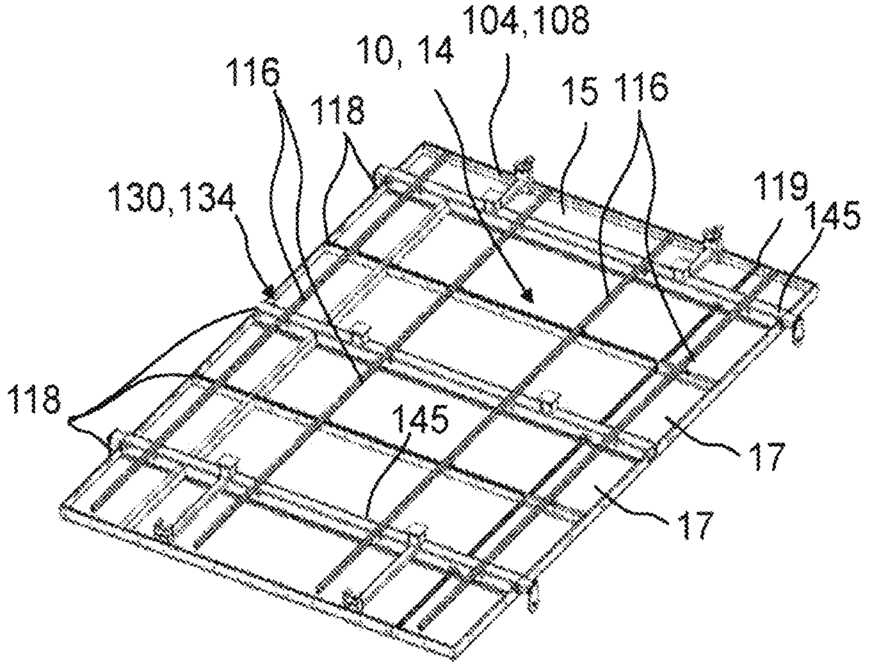
FIG. 31 shows a bottom view of the bottom wall or top wall according to FIG. 30.
Figure 32:
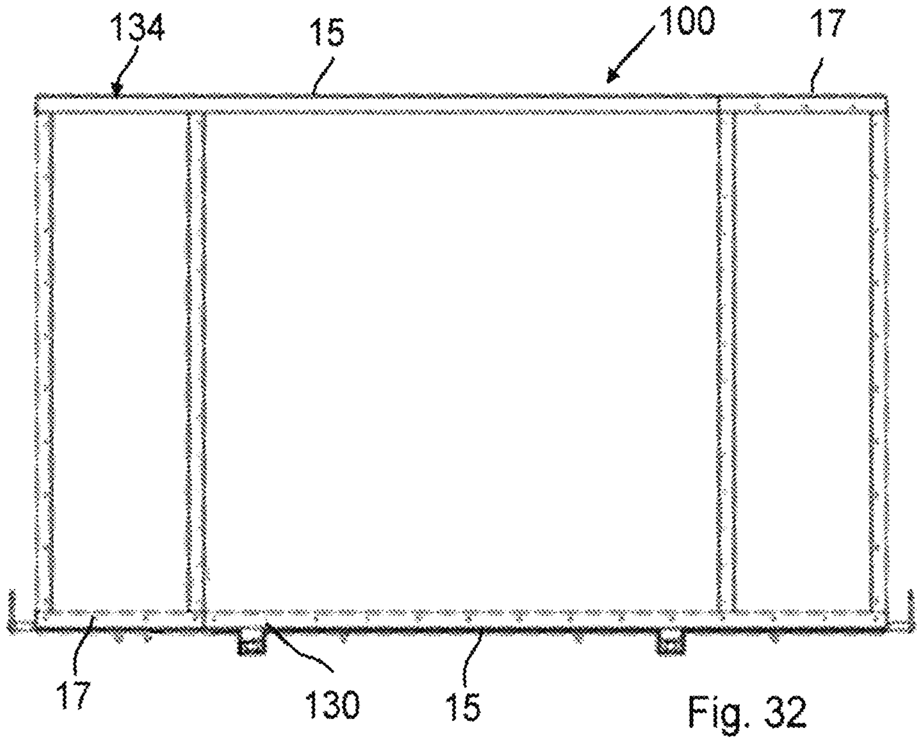
FIG. 32 shows a side view of a treatment module with a bottom wall and a top wall according to FIG. 30.
Figure 33:
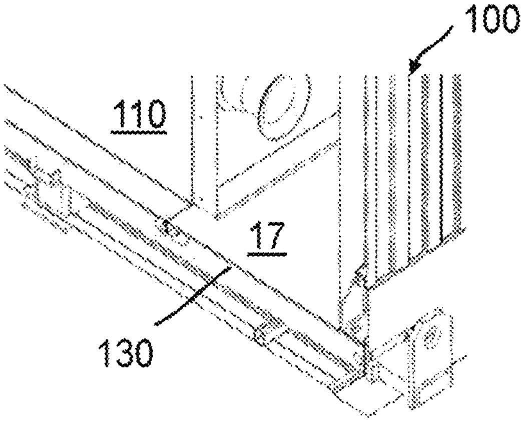
FIG. 33 shows a detailed view of a treatment module with a bottom wall according to FIG. 30.
Figure 34:
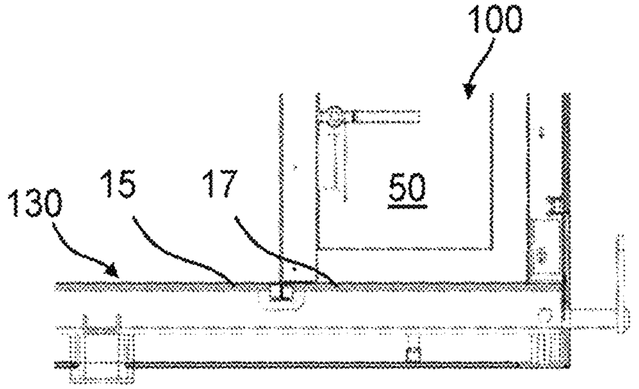
FIG. 34 shows a detailed view of a treatment module with a door and a bottom wall according to FIG. 30.
Figure 35:
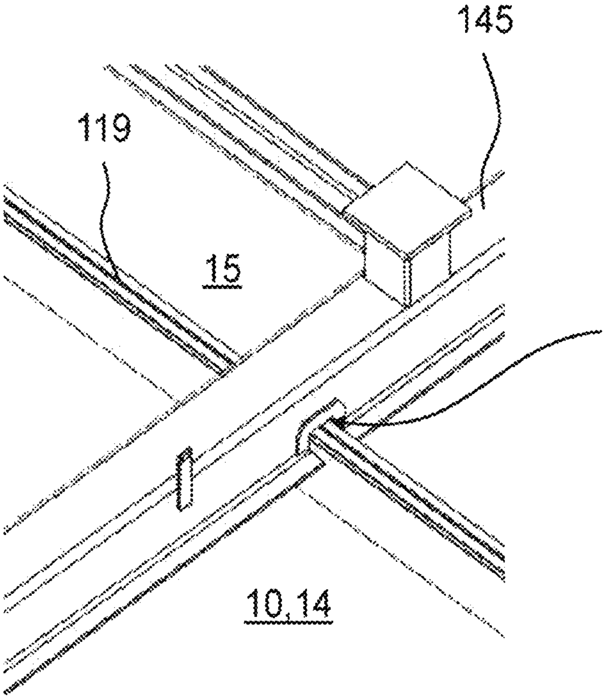
FIG. 35 shows details of a connection of elements of a bottom wall or top wall according to an exemplary embodiment of the invention.
Figure 36:
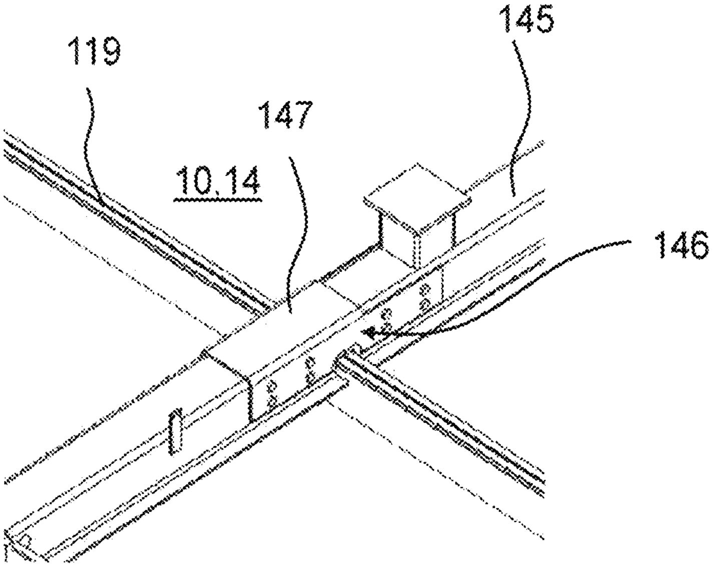
FIG. 36 shows details of the connection according to FIG. 35.

FIGS. 30 to 36 show an embodiment of a bottom wall according to a further exemplary embodiment of the invention in different views and applications in the case of a treatment module 100. In this case FIG. 30 shows a plan view of the bottom wall 130 which in FIG. 31 is shown as a bottom view. FIG. 32 shows a side view of the treatment module 100 with a bottom wall 130 and a top wall 134 according to FIG. 30. FIG. 33 shows a detailed view of a treatment module 100 with a bottom wall 130 according to FIG. 30, and FIG. 34 shows a detailed view of a treatment module 100 with a door segment 50 and a bottom wall 130 according to FIG. 30. FIG. 35 shows details of a connection of elements of a bottom wall 130 or top wall 134 according to FIG. 30, wherein FIG. 36 shows details of the connection according to FIG. 35.

In contrast to a top wall 134, a bottom wall 130 has additional elements, not shown in more detail here, such as for example lateral lifting plugs and underside feet. Top walls 134, however, are designed similar to the bottom walls 130 regarding the cassettes 10, 14, 15.

The cassettes 10, 14, 15 in this exemplary embodiment are arranged within the surface element 104 or 108 with their longitudinal sides 68 transversely to the longitudinal extent 140 and with their transverse sides 66 parallel to the longitudinal extent 140 of the surface element 104 or 108 in some regions. Cassettes 17 are arranged with their transverse sides 66 transversely to the longitudinal extent 140 and with their longitudinal sides 68 parallel to the longitudinal extent 140 of the surface element 104 or 108 in some regions.

The bottom wall 130 or top wall 134 can be formed from cassettes 10, 14, 15, 17 so that a plurality of cassettes 10, 14, 15, here for example five cassettes 10, 14 and one cassette 15, are joined together on their longitudinal sides to form a composite structure. Such cassettes 10, 14, 15 can be joined together on the narrow sides of the cassettes 10, 14, 15 and form the corresponding bottom wall 130 or top wall 134. The cassettes 10, 14 have the same dimensions, whilst the terminal cassette 15 at the end of the composite structure in this example has a width which is less than the width 90 of the cassettes 10, 14. The cassettes 10, 14, 15 have the same length 94.

On the narrow sides of the cassettes 10, 14, 15, on one side of the composite structure, two of the cassettes 17 can bear with their longitudinal sides transversely to the cassettes 10, 14, 15 of the composite structure, for example connected via joining seams 119. The transversely located cassettes 17 abut against one another with their narrow sides. Thus only a composite structure of cassettes 10, 14, 15 has to be manufactured, two cassettes 17 being assembled thereon transversely to the cassettes of the composite structure. This advantageously reduces the production time of the bottom wall 130 and top wall 134.

The bottom view of FIG. 31 shows a construction for connecting the cassettes 10, 14, 15, 17 of the bottom wall 130.

As FIG. 32 shows, the top wall 134 and the bottom wall 130 can be assembled in a treatment module 100, such that the two transversely located cassettes 17 are arranged on the composite structure of cassettes 10, 14, 15 on opposing sides of the treatment module 100.

The connection between the transversely located cassettes 17 and the composite structure of cassettes 10, 14, 15 is ideally located in the region of the inner wall 111 or 110 so that both the bottom wall 130 or top wall 134 and the connection to the inner wall can be sealingly welded simply by means of a single continuous welded seam.

FIGS. 35 and 36 show advantageous connections for such a bottom wall 130 according to FIG. 30. A transverse strut 145 is located over the joining seams between the cassettes 10, 14, 15 and the cassettes 17 located transversely thereto. In each case a recess 146 is configured in the transverse struts 145, the edges with the joining seams between the cassettes 10, 14, 15 and the cassettes 17 being able to engage therein. For improved transport, these transverse struts 145 can be divided in this region. In this case, a connecting shoe 147 which is of U-shaped configuration and which connects the divided transverse struts 145 is used.

Figure 37:
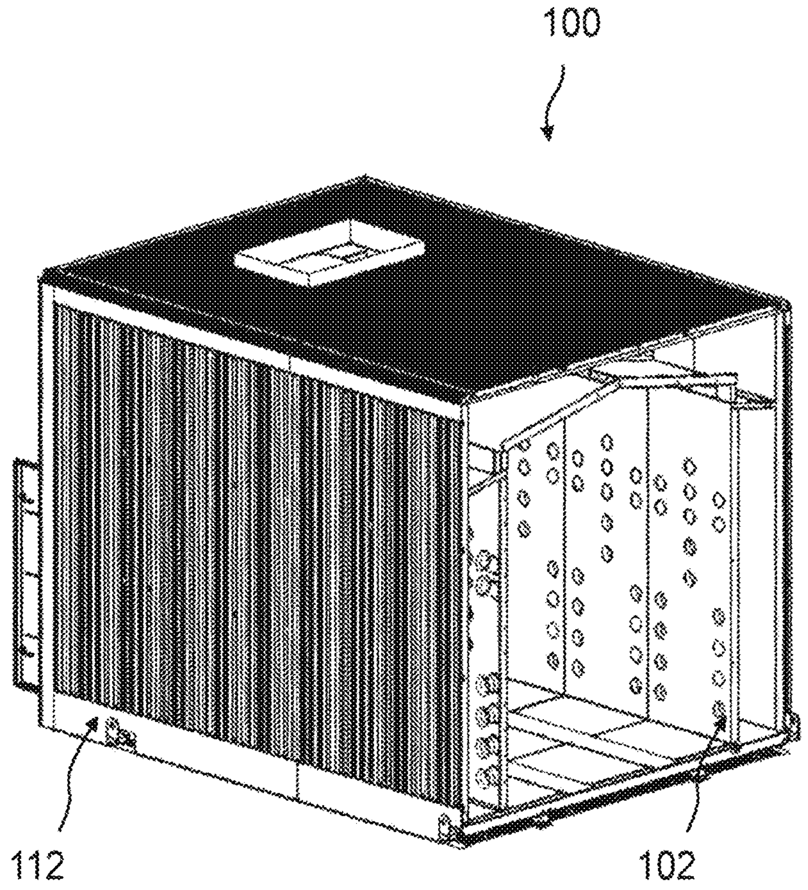
FIG. 37 shows a treatment tunnel for cooling according to an exemplary embodiment of the invention.

FIG. 37 shows a treatment module 100 for cooling according to an exemplary embodiment of the invention, said treatment module in a comparable manner being able to be constructed in a modular manner and having an inner housing 102 and an outer housing 112. Nozzle walls are provided here for cooling heated components. Such a treatment module 100 can adjoin, for example, a treatment tunnel 200 as described in FIG. 29.

Figure 38:
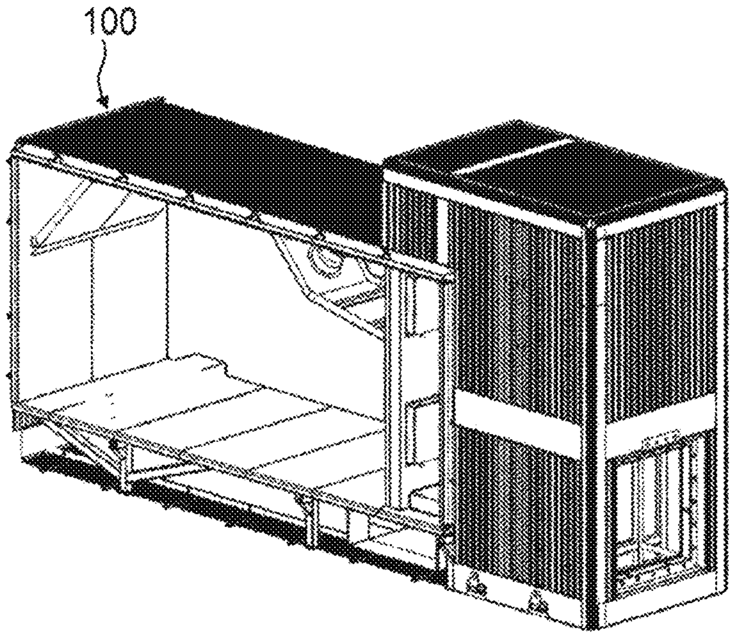
FIG. 38 shows a treatment tunnel for the transverse conveyance of vehicle bodies, for example, according to an exemplary embodiment of the invention.

FIG. 38 shows a treatment module 100 as a treatment tunnel for the transverse conveyance of the vehicle bodies with an adjoining heating segment according to an exemplary embodiment of the invention, said heating segment in a comparable manner being able to be constructed in a modular manner.

Figure 39:
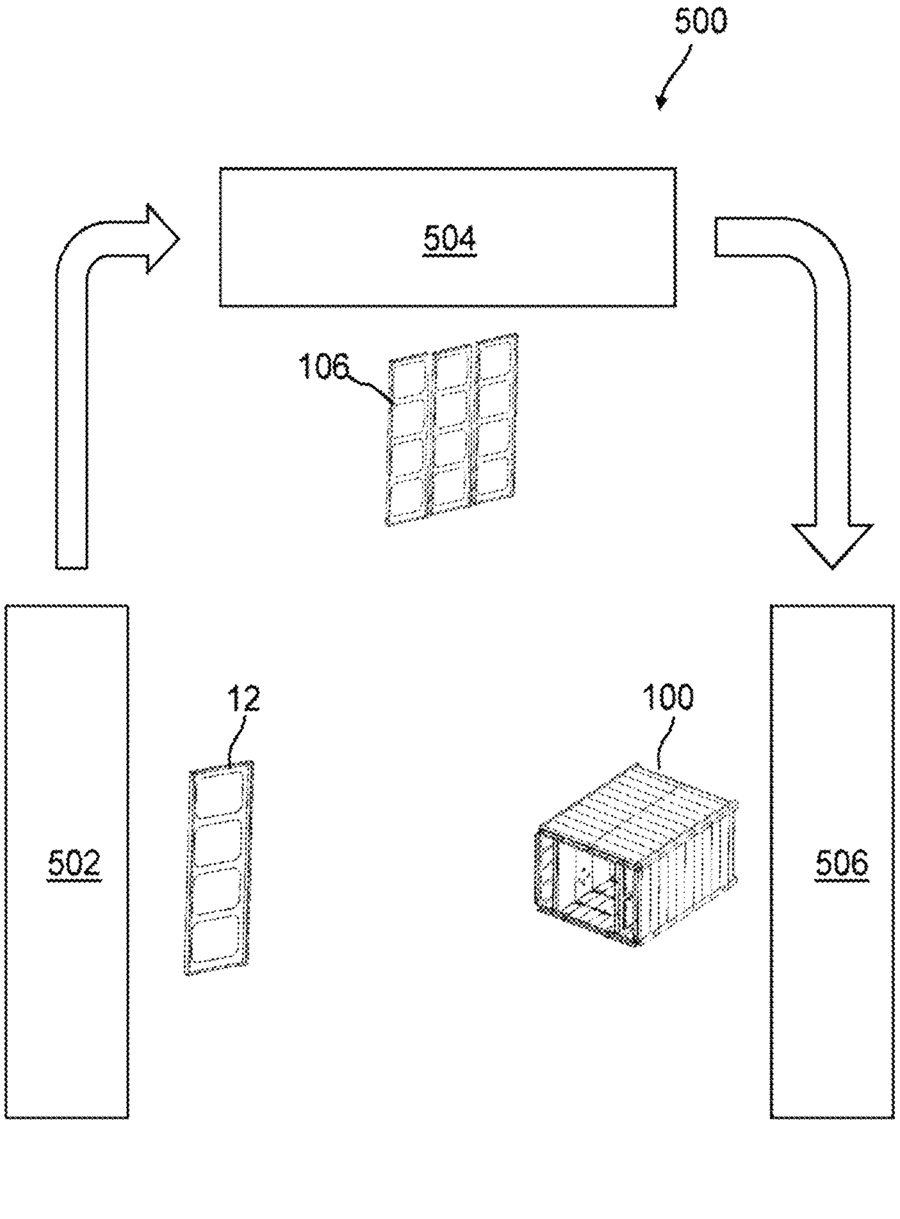
FIG. 39 shows a production system for treatment modules according to an exemplary embodiment of the invention.

In FIG. 39 a production system 500 for producing treatment modules 100 according to an exemplary embodiment of the invention is shown. The production system 500 comprises a first line 502 for producing prefabricated cassettes 10, 11, 12, 13, 14, in particular bottom wall cassettes 10, side wall cassettes 12, top wall cassettes 14 and inner wall cassettes 11, 13. Furthermore, the production system comprises a second line 504 for connecting the prefabricated cassettes 10, 11, 12, 13, 14 to surface elements 104, 105, 106, 107, 108, in particular to form bottom walls 130, side walls 132, top walls 134 and inner walls 110, 111, as well as a third line 506 for connecting the surface elements 104, 105, 106, 107, 108 to a treatment module 100. In the first line 502, in particular, production steps are implemented by means of cutting and bending. "Separating" in this case can encompass methods such as for example, stamping, cutting, shearing, laser treatment.

In the second line 504, in particular, production steps are implemented by means of joining, applying cladding and/or insulation. In the third line 506, in particular, production steps are implemented by means of joining surface elements 104, 105, 106, 107, 108, insulating and cladding corner connections 28.

Advantageously, in the production line 500 according to the invention, cassettes 10, 11, 12, 13, 14 can be manufactured fully automatically on the first line 502. This is particularly advantageous since the cassettes 10, 11, 12, 13, 14 have a similar basic structure in each case for the bottom wall 130, side wall 132, top wall 134 and inner walls 110, 111 and corresponding standard interfaces 80, 82, 84, 86.

Advantageously, conventional sheet metal processing steps such as stamping, cutting, shearing, bending and reshaping can take place on the first line 502 for manufacturing the cassettes 10, 11, 12, 13, 14. The prefabricated cassettes 10, 11, 12, 13, 14 can then be joined on the second line to form surface elements 104, 105, 106, 107, 108 in the form of the bottom wall 130, side wall 132, top wall 134 and inner walls 110, 111. Cladding elements 114 and/or insulating elements 76 can be attached, whilst the finished surface elements 104, 105, 106, 107, 108 can then be joined together on the third line 503 to form whole treatment modules 100.

The transport and assembly of the cassettes 10, 11, 12, 13, 14 can be carried out in continuous flow production on transport tracks, for example roller tables, ball tables, brush tables, so that a crane is not required in order to move the parts. The processes are able to be easily automated. A simple assembly of the cassettes 10, 11, 12, 13, 14 is possible by the presence of positioning elements such as bores, embossed portions, raised portions, depressions or stops, i.e. no measurement of the components is required.

REFERENCE NUMERALS

10 Cassette
11 Cassette
12 Cassette
13 Cassette
14 Cassette
15 Narrow cassette
16 Main surface
17 Transverse cassette
18 Stiffening structure
20 Support strip
22 Pressure strip
24 Frame element
26 Positioning element
27 Positioning element
28 Corner connection
30 Embossed portion
32 Filter frame
34 Filter insert
36 Clamp
38 Clamp
40 Cassette wall
41 Nozzle outlet
42 Nozzle
43 Tongue/groove holder
44 Locking element
45 Flange
46 Recess
48 Tab
50 Door segment
51 Control lever
52 Door hinge
53 Adjusting screw
54 Door frame
55 Spring
56 Door leaf
57 Pressure plate
58 Seal
59 Seal
60 Compensator
62 Screwing point
64 Telescopic connection
66 Transverse side

68 Longitudinal side
70 Support element
72 Recess
74 Insulating material
76 Insulation
78 Connecting element
80 Standard interface
82 Standard interface
84 Standard interface
86 Standard interface
88 Rivet
90 Cassette width in longitudinal direction
92 Cassette width in longitudinal direction
94 Cassette length transversely to longitudinal direction
96 Cassette length transversely to longitudinal direction
98 Slot
100 Treatment module
102 Inner housing
104 Surface element
105 Surface element
106 Surface element
107 Surface element
108 Surface element
110 Inner wall
111 Inner wall
112 Outer housing
113 Filter box
114 Outer cladding element
115 Cover plate
116 Suspension rail
117 Holder for suspension rail
118 Joining seam
119 Joining seam
120 Module-connecting interface
122 Welding frame
124 Edge
126 Telescopic connection
128 Interior
130 Bottom wall
132 Side wall
134 Top wall
136 Welded edge
138 Cover plate
139 Holder for cover plate
140 Longitudinal extent
142 Transverse extent
144 Transverse extent
145 Transverse strut
146 Holder
147 Connecting shoe
150 Hot side
152 Cold side
160 Bearing foot
162 Limb
164 Plate
166 Opening
170 Guide element
172 Slot
174 Notch
200 Treatment tunnel
210 Installation site
500 Production system
502 Line
504 Line
506 Line

The invention claimed is:

1. A treatment module for a treatment tunnel which has one or more treatment modules following one another in a longitudinal direction, comprising at least one inner housing which has at least one surface element in the form of a bottom wall and/or a side wall and/or a top wall and/or an inner wall, wherein the at least one surface element has a longitudinal extent in the longitudinal direction and a transverse extent transversely to the longitudinal direction, wherein the at least one surface element is formed from prefabricated sheet metal cassettes, which have transverse sides with a cassette width in the longitudinal direction and longitudinal sides with a cassette length transversely to the longitudinal direction, wherein the surface element is divided at least in the longitudinal direction into a grid spacing corresponding to at least one cassette width of the cassettes, wherein (i) the cassettes are arranged within the surface element with their longitudinal sides transversely to the longitudinal extent and with their transverse sides parallel to the longitudinal extent of the surface element at least in some regions, or (ii) the cassettes are arranged within the surface element with their transverse sides transversely to the longitudinal extent and with their longitudinal sides parallel to the longitudinal extent of the surface element at least in some regions, wherein the inner housing is surrounded by a thermally decoupled outer housing, and wherein the inner housing is movable independently in the longitudinal direction in the case of a thermally induced length change.

2. The treatment module as claimed in claim 1, wherein each cassette has one or more standard interfaces for a connection to an adjacent cassette at least in the same and/or adjacent surface element.

3. The treatment module as claimed in claim 1, wherein a standard interface has at least one frame element with at least one positioning element for a connection of a cassette to an adjacent cassette in the same or in an adjacent surface element, in particular wherein the at least one frame element is configured as a protruding tab, in particular as an angled-back tab, in particular as a folded-over edge.

4. The treatment module as claimed in claim 1, wherein a standard interface has at least one frame element with at least one positioning element and/or at least one embossed portion, in particular at least one embossed portion in a main surface of the cassette for a connection of a cassette to an adjacent cassette in different adjoining surface elements, in particular wherein the at least one embossed portion is provided for positioning at least one inner wall of the inner housing.

5. The treatment module as claimed in claim 4, wherein a standard interface between a side wall and a bottom wall has a support strip which is configured, in particular, for supporting the side wall.

6. The treatment module as claimed in claim 4, wherein a standard interface between a side wall and a bottom wall has a pressure strip.

7. The treatment module as claimed in claim 1, wherein standard interfaces for connecting cassettes and/or surface elements are configured according to the poka-yoke principle.

8. The treatment module as claimed in claim 1, wherein the prefabricated cassettes have embossed stiffening structures in their main surface.

9. The treatment module as claimed in claim 1, wherein closed and/or locked corner connections are provided for connecting and/or stiffening angled-back frame elements of the cassettes.

10. The treatment module as claimed in claim 1, wherein the surface elements are positioned relative to one another by interlocking profiles of the cassettes.

11. The treatment module as claimed in claim 1, wherein thermally decoupled holders, in particular suspension rails for outer cladding elements, are arranged on the inner housing.

12. The treatment module as claimed in claim 1, wherein the outer housing has one or more outer cladding elements in the form of profiled metal sheets at least in some regions.

13. The treatment module as claimed in claim 1, wherein an inner wall is provided for receiving one or more filter frames, wherein filter inserts are fixed or fixable by clamps in the filter frame.

14. The treatment module as claimed in claim 1, wherein an inner wall is provided for receiving one or more nozzles, in particular wherein an interface between an inner wall and a nozzle has a tongue/grove holder.

15. The treatment module as claimed in claim 1, wherein at least one thermally decoupled door segment is provided in a lateral surface element, wherein at least one door hinge of the door segment has an adjustable spring force.

16. The treatment module as claimed in claim 1, a welding frame is integrated in a surface element for assembly of the treatment module to another treatment module.

17. The treatment module as claimed in claim 1, wherein a thermal compensator for compensating for thermally induced changes in mechanical dimensions is preassembled in the treatment module, the thermal compensator to provide a flexible connection between the treatment module and another treatment module.

18. The treatment module as claimed in claim 1, including insulation between the inner and outer housings.

19. A treatment tunnel which has one or more treatment modules following one another as claimed in claim 1, wherein a welding frame is integrated in a surface element, is provided for assembly of treatment modules to one another.

20. The treatment tunnel as claimed in claim 19, wherein a thermal compensator is provided for a flexible connection between treatment modules to compensate for thermally induced changes in mechanical dimensions.

21. The treatment tunnel as claimed in claim 20, wherein the thermal compensator includes textile fabric that is screwed via screwing points to the cassettes of two treatment modules.

22. The treatment tunnel as claimed in claim 19, wherein a telescopic connection is provided for connecting at least two outer cladding elements.

23. A production system for a treatment module as claimed in claim 1, comprising at least a first line for producing prefabricated cassettes, in particular sheet metal cassettes, in particular bottom wall cassettes, side wall cassettes, top wall cassettes, inner wall cassettes, a second line for connecting the prefabricated cassettes to form surface elements, in particular to form the bottom wall, side wall, top wall, inner wall, a third line for connecting the surface elements to form the treatment module.

24. The production system as claimed in claim 23, wherein in the first line production steps are implemented by separating and bending, in particular stamping, cutting, shearing, laser treatment, and/or wherein in the second line production steps are implemented by joining, applying cladding and/or insulation, and/or wherein in the third line production steps are implemented by joining surface elements, insulating and cladding corner connections.

* * * * *